US012233625B2

(12) United States Patent
Collins et al.

(10) Patent No.: US 12,233,625 B2
(45) Date of Patent: *Feb. 25, 2025

(54) ELECTROCHROMIC WINDOW FABRICATION METHODS

(71) Applicant: View, Inc., Milpitas, CA (US)

(72) Inventors: Mark A. Collins, Foster City, CA (US); Ronald M. Parker, Olive Branch, MS (US); Robert T. Rozbicki, Saratoga, CA (US); Dhairya Shrivastava, Los Altos, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,355

(22) Filed: Aug. 31, 2023

(65) Prior Publication Data
US 2024/0123708 A1 Apr. 18, 2024

Related U.S. Application Data

(63) Continuation of application No. 16/863,945, filed on Apr. 30, 2020, now Pat. No. 11,772,366, which is a
(Continued)

(51) Int. Cl.
G02F 1/153 (2006.01)
B32B 17/10 (2006.01)
(Continued)

(52) U.S. Cl.
CPC .. *B32B 17/10055* (2013.01); *B32B 17/10128* (2013.01); *B32B 17/10183* (2013.01);
(Continued)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS 4,368,945 A 1/1983 Fujimori et al.
5,066,111 A 11/1991 Singleton et al.
(Continued)

FOREIGN PATENT DOCUMENTS

CN 1510494 A 7/2004
CN 1570341 A 1/2005
(Continued)

OTHER PUBLICATIONS

CA Office Action dated Jan. 21, 2022, in Application No. CA2935687.
(Continued)

*Primary Examiner* — Dawayne Pinkney
(74) *Attorney, Agent, or Firm* — Weaver Austin Villeneuve & Sampson LLP; Brian D. Griedel

(57) ABSTRACT

Methods of manufacturing electrochromic windows are described. An electrochromic device is fabricated to substantially cover a glass sheet, for example float glass, and a cutting pattern is defined based on one or more low-defectivity areas in the device from which one or more electrochromic panes are cut. Laser scribes and/or bus bars may be added prior to cutting the panes or after. Edge deletion can also be performed prior to or after cutting the electrochromic panes from the glass sheet. Insulated glass units (IGUs) are fabricated from the electrochromic panes and optionally one or more of the panes of the IGU are strengthened.

15 Claims, 10 Drawing Sheets

Related U.S. Application Data continuation of application No. 16/267,260, filed on Feb. 4, 2019, now Pat. No. 10,684,524, which is a continuation of application No. 15/226,835, filed on Aug. 2, 2016, now Pat. No. 10,241,375, which is a continuation of application No. 14/740,114, filed on Jun. 15, 2015, now Pat. No. 9,513,525, which is a continuation of application No. 13/431,729, filed on Mar. 27, 2012, now Pat. No. 9,102,124, which is a continuation of application No. 12/941,882, filed on Nov. 8, 2010, now Pat. No. 8,164,818.

(51) Int. Cl.
| | | |
|---|---|---|
| *G02B 1/14* | (2015.01) | |
| *G02F 1/01* | (2006.01) | |
| *G02F 1/03* | (2006.01) | |
| *G02F 1/1333* | (2006.01) | |
| *G02F 1/15* | (2019.01) | |
| *G02F 1/155* | (2006.01) | |
| *G02F 1/161* | (2006.01) | |
| *G09G 3/19* | (2006.01) | |
| *H04N 9/16* | (2006.01) | |

(52) U.S. Cl.
CPC .. *B32B 17/10513* (2013.01); *B32B 17/10697* (2013.01); *B32B 17/10908* (2013.01); *B32B 17/1099* (2013.01); *G02B 1/14* (2015.01); *G02F 1/133308* (2013.01); *G02F 1/153* (2013.01); *G02F 1/1533* (2013.01); *G02F 1/155* (2013.01); *G02F 1/161* (2013.01); *B32B 2333/12* (2013.01); *G02F 1/133311* (2021.01); *Y10T 29/49004* (2015.01); *Y10T 29/49124* (2015.01); *Y10T 156/1052* (2015.01); *Y10T 156/1062* (2015.01)

(58) Field of Classification Search
CPC .......... G02F 1/0316; G02F 3/16; G02F 1/163; C09K 9/02; B60R 1/088; H04N 9/3137; H04N 9/22
USPC ........ 359/265–275, 277, 245–247, 254, 242; 345/49, 105; 250/70; 348/817; 438/929
See application file for complete search history.

(56) References Cited

U.S. PATENT DOCUMENTS

| | | |
|---|---|---|
| 5,124,833 A | 6/1992 | Barton et al. |
| 5,244,557 A | 9/1993 | Defendini et al. |
| 5,288,433 A | 2/1994 | Stevens |
| 5,379,146 A | 1/1995 | Defendini |
| 5,604,626 A | 2/1997 | Teowee et al. |
| 5,657,149 A | 8/1997 | Buffat et al. |
| 5,657,150 A | 8/1997 | Kallman et al. |
| 5,724,175 A | 3/1998 | Hichwa et al. |
| 5,825,526 A | 10/1998 | Bommarito et al. |
| 5,916,398 A | 6/1999 | Coleman et al. |
| 5,985,486 A | 11/1999 | Giron |
| 6,001,487 A | 12/1999 | Ladang et al. |
| 6,045,896 A | 4/2000 | Boire et al. |
| 6,055,088 A | 4/2000 | Fix et al. |
| 6,204,953 B1 | 3/2001 | Zieba et al. |
| 6,261,641 B1 | 7/2001 | Zieba et al. |
| 6,337,758 B1 | 1/2002 | Beteille et al. |
| 6,407,847 B1 | 6/2002 | Poll et al. |
| 6,515,787 B1 | 2/2003 | Westfall et al. |
| 6,529,308 B2 | 3/2003 | Beteille et al. |
| 6,559,411 B2 | 5/2003 | Borgeson et al. |
| 6,639,708 B2 | 10/2003 | Elkadi et al. |
| 6,822,778 B2 | 11/2004 | Westfall et al. |
| 6,919,530 B2 | 7/2005 | Borgeson et al. |
| 7,002,720 B2 | 2/2006 | Beteille et al. |
| 7,033,655 B2 | 4/2006 | Beteille et al. |
| 7,230,748 B2 | 6/2007 | Giron et al. |
| 7,531,101 B2 | 5/2009 | Beteille |
| 7,593,154 B2 | 9/2009 | Burdis et al. |
| 7,710,671 B1 | 5/2010 | Kwak et al. |
| 7,777,933 B2 | 8/2010 | Piroux et al. |
| 7,869,114 B2 | 1/2011 | Valentin et al. |
| 7,894,119 B2 | 2/2011 | Valentin et al. |
| 7,929,194 B2 | 4/2011 | Legois et al. |
| 7,952,785 B2 | 5/2011 | Karmhag et al. |
| 8,035,882 B2 | 10/2011 | Fanton et al. |
| 8,115,984 B2 | 2/2012 | Agrawal et al. |
| 8,164,818 B2 | 4/2012 | Collins et al. |
| 8,213,074 B1 | 7/2012 | Shrivastava et al. |
| 8,218,224 B2 | 7/2012 | Kwak et al. |
| 8,243,357 B2 | 8/2012 | Kozlowski et al. |
| 8,270,059 B2 | 9/2012 | Friedman et al. |
| 8,274,730 B2 | 9/2012 | Valentin et al. |
| 8,289,610 B2 | 10/2012 | Veerasamy |
| 8,482,837 B2 | 7/2013 | Sbar et al. |
| 8,482,838 B2 | 7/2013 | Sbar et al. |
| 8,711,465 B2 | 4/2014 | Bhatnagar et al. |
| 9,081,246 B2 | 7/2015 | Rozbicki |
| 9,102,124 B2 | 8/2015 | Collins et al. |
| 9,477,130 B2 | 10/2016 | Dubrenat et al. |
| 9,481,598 B2 | 11/2016 | Bergh et al. |
| 9,482,921 B2 | 11/2016 | Lamine et al. |
| 9,513,525 B2 | 12/2016 | Collins et al. |
| 10,241,375 B2 | 3/2019 | Collins et al. |
| 10,606,142 B2 | 3/2020 | Tran et al. |
| 10,684,524 B2 | 6/2020 | Collins et al. |
| 10,739,658 B2 | 8/2020 | Rozbicki |
| 11,048,137 B2 | 6/2021 | Tran et al. |
| 11,772,366 B2 | 10/2023 | Collins et al. |
| 11,953,798 B2 | 4/2024 | Rozbicki |
| 2002/0021481 A1 | 2/2002 | Lin et al. |
| 2002/0041443 A1 | 4/2002 | Varaprasad et al. |
| 2002/0075552 A1 | 6/2002 | Poll et al. |
| 2002/0125484 A1 | 9/2002 | Silvernail et al. |
| 2003/0038365 A1 | 2/2003 | Farnworth et al. |
| 2004/0047050 A1 | 3/2004 | Bauer et al. |
| 2004/0060416 A1 | 4/2004 | Luiz |
| 2004/0082252 A1 | 4/2004 | Liao et al. |
| 2004/0182435 A1 | 9/2004 | Pettersson et al. |
| 2005/0002081 A1 | 1/2005 | Beteille et al. |
| 2005/0023337 A1 | 2/2005 | Benischke et al. |
| 2005/0104136 A1 | 5/2005 | Edwards et al. |
| 2006/0007550 A1 | 1/2006 | Tonar et al. |
| 2006/0018000 A1 | 1/2006 | Greer |
| 2006/0076555 A1 | 4/2006 | Liao et al. |
| 2006/0077511 A1 | 4/2006 | Poll et al. |
| 2007/0020442 A1 | 1/2007 | Giron et al. |
| 2007/0097481 A1 | 5/2007 | Burdis et al. |
| 2007/0103761 A1 | 5/2007 | Giron et al. |
| 2007/0133078 A1 | 6/2007 | Fanton et al. |
| 2007/0153356 A1 | 7/2007 | McCabe et al. |
| 2008/0238828 A1 | 10/2008 | Nakayama et al. |
| 2009/0058295 A1 | 3/2009 | Auday et al. |
| 2009/0067031 A1 | 3/2009 | Piroux et al. |
| 2009/0068455 A1 | 3/2009 | Albrecht et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0130409 A1 | 5/2009 | Reutler et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0251758 A1 | 10/2009 | Valentin et al. |
| 2009/0262411 A1 | 10/2009 | Karmhag et al. |
| 2009/0284821 A1 | 11/2009 | Valentin et al. |
| 2009/0297806 A1 | 12/2009 | Dawson-Elli et al. |
| 2009/0304970 A1 | 12/2009 | Imaizumi et al. |
| 2009/0316248 A1 | 12/2009 | Karmhag et al. |
| 2010/0110523 A1 | 5/2010 | Varaprasad et al. |
| 2010/0177380 A1 | 7/2010 | Nagahama et al. |
| 2010/0208326 A1 | 8/2010 | Kwak et al. |
| 2010/0243427 A1 | 9/2010 | Kozlowski et al. |
| 2010/0245973 A1 | 9/2010 | Wang et al. |
| 2010/0294330 A1 | 11/2010 | Huang et al. |

(56) References Cited

U.S. PATENT DOCUMENTS

| | | | |
|---|---|---|---|
| 2011/0043885 A1 | 2/2011 | Lamine et al. |
| 2011/0045172 A1 | 2/2011 | Varaprasad et al. |
| 2011/0048614 A1 | 3/2011 | Veerasamy |
| 2011/0051221 A1 | 3/2011 | Veerasamy |
| 2011/0059275 A1 | 3/2011 | Stark |
| 2011/0206873 A1 | 8/2011 | Showers |
| 2011/0216389 A1 | 9/2011 | Piroux et al. |
| 2011/0260961 A1 | 10/2011 | Burdis |
| 2011/0261429 A1 | 10/2011 | Sbar et al. |
| 2011/0266137 A1 | 11/2011 | Wang et al. |
| 2011/0266138 A1 | 11/2011 | Wang et al. |
| 2011/0267672 A1 | 11/2011 | Sbar et al. |
| 2011/0267674 A1 | 11/2011 | Wang et al. |
| 2011/0267675 A1 | 11/2011 | Wang et al. |
| 2011/0299149 A1 | 12/2011 | Park et al. |
| 2011/0304899 A1 | 12/2011 | Kwak et al. |
| 2012/0026573 A1 | 2/2012 | Collins et al. |
| 2012/0156457 A1 | 6/2012 | Kondo |
| 2012/0182593 A1 | 7/2012 | Collins et al. |
| 2012/0229882 A1 | 9/2012 | Fish, Jr. et al. |
| 2012/0327449 A1 | 12/2012 | Lee |
| 2012/0327499 A1 | 12/2012 | Parker et al. |
| 2013/0114219 A1 | 5/2013 | Garner et al. |
| 2013/0278988 A1 | 10/2013 | Jack et al. |
| 2013/0334402 A1 | 12/2013 | Izuha et al. |
| 2014/0085701 A1 | 3/2014 | Selles et al. |
| 2014/0329006 A1 | 11/2014 | Bhatnagar et al. |
| 2015/0097944 A1 | 4/2015 | Palm et al. |
| 2015/0110991 A1 | 4/2015 | Miwa et al. |
| 2015/0346574 A1 | 12/2015 | Collins et al. |
| 2016/0138328 A1 | 5/2016 | Behmke et al. |
| 2016/0141258 A1 | 5/2016 | Jain et al. |
| 2016/0154290 A1 | 6/2016 | Brown et al. |
| 2016/0334688 A1 | 11/2016 | Tran et al. |
| 2016/0342060 A1 | 11/2016 | Collins et al. |
| 2017/0028685 A1 | 2/2017 | Giron et al. |
| 2017/0066679 A1 | 3/2017 | Yeh |
| 2017/0255075 A1 | 9/2017 | Tran et al. |
| 2018/0196324 A1 | 7/2018 | Rozbicki |
| 2018/0259822 A1 | 9/2018 | Dixit et al. |
| 2019/0137839 A1 | 5/2019 | Orillard et al. |
| 2019/0243204 A1 | 8/2019 | Collins et al. |
| 2020/0398535 A1 | 12/2020 | Collins et al. |
| 2021/0018811 A1 | 1/2021 | Rozbicki |
| 2021/0191212 A1 | 6/2021 | Tran et al. |
| 2022/0111619 A1 | 4/2022 | Sbar et al. |
| 2024/0184179 A1 | 6/2024 | Rozbicki |

FOREIGN PATENT DOCUMENTS

| | | |
|---|---|---|
| CN | 1249508 C | 4/2006 |
| CN | 101322069 A | 12/2008 |
| CN | 101765808 A | 6/2010 |
| CN | 1991491 B | 9/2010 |
| CN | 102057323 A | 5/2011 |
| CN | 102540612 A | 7/2012 |
| CN | 102596565 A | 7/2012 |
| CN | 102883880 A | 1/2013 |
| CN | 103261960 A | 8/2013 |
| CN | 113448005 A | 9/2021 |
| DE | 10118614 A1 | 10/2002 |
| DE | 10118617 A1 | 11/2002 |
| DE | 102006042538 A1 | 3/2008 |
| EP | 2348357 A2 | 7/2011 |
| GB | 8508590 | 5/1985 |
| TW | 481649 | 4/2002 |
| TW | 200610962 A | 4/2006 |
| TW | I290622 B | 12/2007 |
| TW | 200823956 A | 6/2008 |
| TW | 200834153 A | 8/2008 |
| TW | I307183 B | 3/2009 |
| TW | I311128 B | 6/2009 |
| TW | 200935548 A | 8/2009 |
| TW | 200950964 A | 12/2009 |
| TW | 201026619 A | 7/2010 |
| TW | 201029838 A | 8/2010 |
| TW | I328870 B | 8/2010 |
| TW | 201037371 A | 10/2010 |
| TW | 201200933 A | 1/2012 |
| TW | 201342509 A | 10/2013 |
| WO | WO-2004026633 A2 | 4/2004 |
| WO | WO-2005076061 A1 | 8/2005 |
| WO | WO-2008043951 A2 | 4/2008 |
| WO | WO-2009145876 A1 | 12/2009 |
| WO | WO-2009148861 A2 | 12/2009 |
| WO | WO-2010043994 A1 | 4/2010 |
| WO | WO-2011010067 A2 | 1/2011 |
| WO | WO-2011028253 A2 | 3/2011 |
| WO | WO-2011028254 A2 | 3/2011 |
| WO | WO-2011050291 A2 | 4/2011 |
| WO | WO-2011061110 A1 | 5/2011 |
| WO | WO-2011109688 A1 | 9/2011 |
| WO | WO-2012157610 A1 | 11/2012 |
| WO | WO-2013049379 A1 | 4/2013 |
| WO | WO-2013090209 A1 | 6/2013 |
| WO | WO-2013090264 A1 | 6/2013 |
| WO | WO-2013151035 A1 | 10/2013 |
| WO | WO-2014170241 A2 | 10/2014 |
| WO | WO-2015103433 A1 | 7/2015 |
| WO | WO-2017008053 A1 | 1/2017 |
| WO | WO-2017075472 A1 | 5/2017 |
| WO | WO-2017155833 A1 | 9/2017 |

OTHER PUBLICATIONS

CA Office Action dated Oct. 26, 2022, in Application No. CA2935687.
Canadian Office Action dated Feb. 23, 2021 in Canadian Application No. 2,935,687.
CN Decision of Rejection dated Apr. 16, 2021 in CN Application No. 201480073448.4, without English translation.
CN Notice of Rejection dated Jun. 19, 2017 in CN Application No. 201180057861.8.
CN Office Action dated Apr. 28, 2015 in CN Application No. 201180057861.8.
CN Office Action dated Apr. 29, 2022 in Application No. CN201910398563.3 with English translation.
CN Office Action dated Feb. 2, 2019 in CN Application No. 201480073448.4.
CN Office Action dated Feb. 29, 2016 in CN Application No. 201180057861.8.
CN Office Action dated Jul. 29, 2021 in CN Application No. 201910398563.3.
CN Office Action dated Mar. 2, 2023 in Application No. 201480073448.4 with English translation.
CN Office Action dated Mar. 13, 2020 in CN Application No. 201480073448.4, with English translation.
CN Office Action dated May 31, 2023 in Application No. 201480073448.4 with English translation.
CN Office Action dated Nov. 13, 2020 in CN Application No. 201480073448.4, with English translation.
CN Office Action dated Oct. 9, 2021 in CN Application No. 201910398563.3 with English translation.
CN Office Action dated Oct. 14, 2019 in CN Application No. 201480073448.4.
CN Office Action dated Oct. 28, 2016 in CN Application No. 201180057861.8.
CN Office Action dated Sep. 4, 2018 in CN Application No. 201180057861.8.
European Office Action dated Apr. 5, 2019 in EP Application No. 14876073.9.
European Office Action dated Jun. 6, 2019 in EP Application No. 11840328.6.
European Office Action dated Nov. 11, 2020 in EP Application No. 14876073.9.
European Office Action dated Sep. 21, 2023 in Application No. EP21151443.5.
Extended European Search Report, dated Apr. 6, 2017 in EP Application No. 11840328.6.

(56) References Cited

OTHER PUBLICATIONS

Extended European Search Report, dated Jul. 18, 2017 in EP Application No. 14876073.9.
Extended European Search Report, dated Jul. 26, 2021 in EP Application No. 21151443.5.
"Float Glass Inspection", Webview, Inc., 2006, 2 pgs.
"In-Line Quality & Process Control for Coated Flat Glass", Dr. Schenk GmbH Industriemesstechnik, Oct. 2008, 3 pgs.
"In-Line Surface Inspection for Glass Manufacturing and Processing", Dr. Schenk GmbH Industriemesstechnik, Apr. 2009, 3 pgs.
International Preliminary Report on Patentability dated Jan. 18, 2018 in PCT/US2016/041624.
International Preliminary Report on Patentability dated Jul. 14, 2016 in PCT/US2014/073081.
International Preliminary Report on Patentability dated May 23, 2013, issued in PCT/US2011/057916.
International Search Report and Written Opinion, dated Apr. 27, 2012, issued in PCT/US2011/057916.
International Search Report and Written Opinion dated Mar. 25, 2015 in PCT/US2014/073081.
International Search Report and Written Opinion dated Oct. 17, 2016 in PCT/US2016/041624.
Notice of Allowance, dated Mar. 7, 2012, for U.S. Appl. No. 12/941,882.
Notice of Intention to Grant, dated Sep. 4, 2020 and Appex to EPO from 2004, Communication pursuant to Rule 71(3) EPC in EP Application No. 11840328.6.
Office Action dated Feb. 3, 12 for U.S. Appl. No. 12/941,882.
Office Action dated Sep. 12, 2013 for U.S. Appl. No. 13/431,729.
Preliminary Amendment filed Oct. 12, 2016 in U.S. Appl. No. 15/109,624.
Preliminary Amendment filed Oct. 25, 2016 in U.S. Appl. No. 15/226,835.
Rekow, M et al., "Precision glass processing with picosecond laser pulses," Industrial Laser Solutions for Manufacturing, Mar. 18, 2014. [http://www.industrial-lasers.com/articles/print/volume-29/issue-2/features/precision-glass-processing-with-picosecond-laser-pulses.html].
Taiwanese Office Action dated Apr. 18, 2019 in TW Application No. 108107117, with English translation.
Taiwanese Office Action dated Jun. 26, 2018 in TW Application No. TW 106139146.
Taiwanese Office Action dated Mar. 19, 2021 in TW Application No. 109100620, with English translation.
Taiwanese Office Action dated May 3, 2019 in TW Application No. 108100186.
Taiwanese Office Action dated Oct. 19, 2020 in TW Application No. 109109465, with English Translation.
Taiwanese Search Report from communication dated Oct. 16, 2017 in TW Application No. 106119749, with English Translation.
Taiwanese Second Office Action dated Oct. 9, 2018, in TW Application No. 103146658, with English translation.
TW Office Action dated Aug. 12, 2015 in TW Application No. 100140574.
TW Office Action dated Jul. 29, 2022, in Application No. TW110128716 with English translation.
TW Office Action dated Nov. 29, 2022, in Application No. TW110128716 With English translation.
TW Office Action dated Oct. 5, 2022, in Application No. TW110133083 with EnglishTranslation.
TW Office Action dated Oct. 14, 2016 in TW Application No. 105103054.
U.S. Non-Final office Action dated Sep. 15, 2022 in U.S. Appl. No. 17/195,521.
US Office Action dated Nov. 30, 2018 for U.S. Appl. No. 15/109,624.
U.S. Corrected Notice of Allowance dated Sep. 5, 2023, in U.S. Appl. No. 16/863,945.
US Final Office Action dated Dec. 15, 2017 for U.S. Appl. No. 15/226,835.
US Final Office Action dated Jun. 12, 2014 for U.S. Appl. No. 12/941,882.
U.S. Final Office Action dated Mar. 25, 2022, in U.S. Appl. No. 16/863,945.
US Final Office Action dated Sep. 3, 2019 for U.S. Appl. No. 15/448,414.
U.S. Non-Final Action dated Dec. 8, 2022 in U.S. Appl. No. 16/946,707.
U.S. Non-Final Office Action dated May 4, 2023 in U.S. Appl. No. 17/195,521.
U.S. Non-Final Office Action dated Oct. 13, 2021 in U.S. Appl. No. 16/863,945.
US Notice of Allowance (corrected) dated Aug. 6, 2018 for U.S. Appl. No. 15/226,835.
US Notice of Allowance (corrected) dated Jun. 30, 2016 for U.S. Appl. No. 14/740,114.
U.S. Notice of Allowance dated Apr. 4, 2023 in U.S. Appl. No. 16/946,707.
U.S. Notice of Allowance dated Aug. 2, 2023 in U.S. Appl. No. 16/946,707.
US Notice of Allowance dated Dec. 4, 2019 for U.S. Appl. No. 15/742,017.
US Notice of Allowance dated Dec. 9, 2020 for U.S. Appl. No. 15/448,414.
U.S. Notice of Allowance dated Jan. 25, 2023 in U.S. Appl. No. 16/863,945.
US Notice of Allowance dated Jan. 27, 2020 in U.S. Appl. No. 16/267,260.
US Notice of Allowance dated Jul. 17, 2018 for U.S. Appl. No. 15/226,835.
U.S. Notice of Allowance dated Jul. 26, 2022, in U.S. Appl. No. 16/863,945.
US Notice of Allowance dated Mar. 27, 2015 for U.S. Appl. No. 12/941,882.
US Notice of Allowance dated May 24, 2016 for U.S. Appl. No. 14/740,114.
U.S. Notice of Allowance dated May 26, 2023, in U.S. Appl. No. 16/863,945.
US Notice of Allowance dated May 30, 2019 for U.S. Appl. No. 15/109,624.
U.S. Notice of Allowance dated Nov. 8, 2023 in U.S. Appl. No. 16/946,707.
US Notice of Allowance dated Nov. 6, 2018 for U.S. Appl. No. 15/226,835.
US Notice of Allowance dated Oct. 23, 2019 for U.S. Appl. No. 15/109,624.
US Notice of Allowance dated Sep. 22, 2016 for U.S. Appl. No. 14/740,114.
US Office Action dated Aug. 7, 2019 in U.S. Appl. No. 16/267,260.
US Office Action dated Jan. 10, 2019 for U.S. Appl. No. 15/448,414.
US Office Action dated Jan. 29, 2015 for U.S. Appl. No. 12/941,882.
US Office Action dated Mar. 2, 2020, for U.S. Appl. No. 15/448,414.
US Office Action dated Mar. 21, 2019 for U.S. Appl. No. 15/742,017.
US Office Action dated Mar. 31, 2017 for U.S. Appl. No. 15/226,835.
US Office Action dated Nov. 18, 2015 for U.S. Appl. No. 14/740,114.
Yoldas, B. et al., "Deposition of optically transparent IR reflective coatings on glass," Applied Optics, vol. 23, No. 20, Oct. 15, 1984, pp. 3638-3643.
EP Extended European Search report dated May 13, 2024 in EP Application No. 24156928.4.
EP Office Action dated Jun. 17, 2024, in EP Application No. 24156928.4.
U.S. Final Office Action dated Dec. 7, 2023 in U.S. Appl. No. 17/195,521.

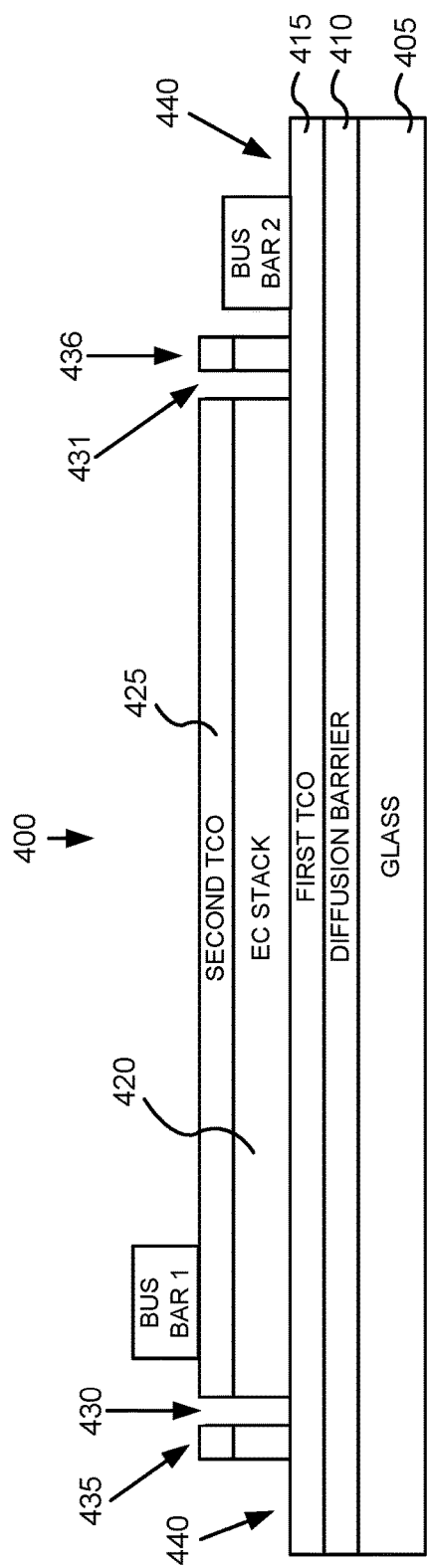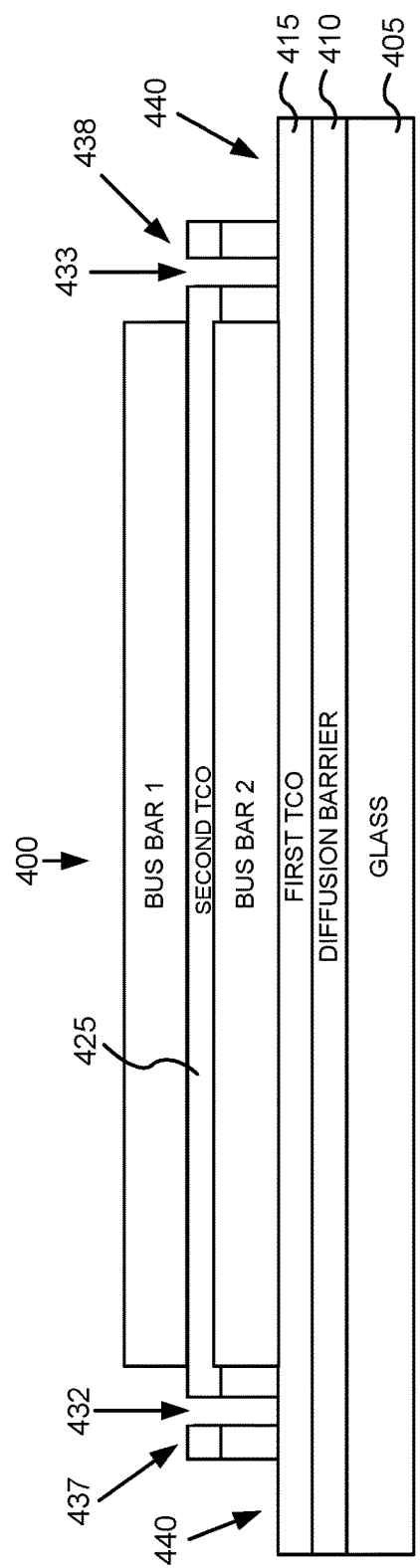

ELECTROCHROMIC WINDOW FABRICATION METHODS

CROSS REFERENCES TO RELATED APPLICATIONS

This application is a continuation of U.S. patent application Ser. No. 16/863,945, filed on Apr. 30, 2020 and titled "ELECTROCHROMIC WINDOW FABRICATION METHODS," which is a continuation of U.S. patent application Ser. No. 16/267,260, filed on Feb. 4, 2019 and titled "ELECTROCHROMIC WINDOW FABRICATION METHODS," which is a continuation of U.S. patent application Ser. No. 15/226,835, filed on Aug. 2, 2016 and titled "ELECTROCHROMIC WINDOW FABRICATION METHODS," which is a continuation of U.S. patent application Ser. No. 14/740,114 (now U.S. Pat. No. 9,513,525), filed on Jun. 15, 2015 and titled "ELECTROCHROMIC WINDOW FABRICATION METHODS," which is a continuation of U.S. patent application Ser. No. 13/431,729 (now U.S. Pat. No. 9,102,124), filed on Mar. 27, 2012 and titled "ELECTROCHROMIC WINDOW FABRICATION METHODS," which is a continuation of U.S. patent application Ser. No. 12/941,882 (now U.S. Pat. No. 8,164,818), filed on Nov. 8, 2010 and titled "ELECTROCHROMIC WINDOW FABRICATION METHODS;" each of these applications is hereby incorporated by reference in its entirety and for all purposes.

FIELD OF INVENTION

The invention relates generally to electrochromic devices, more particularly to electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960's, electrochromic devices, and particularly electrochromic windows, still unfortunately suffer various problems and have not begun to realize their full commercial potential despite many recent advancements in electrochromic technology, apparatus and related methods of making and/or using electrochromic devices.

SUMMARY OF INVENTION

Methods of manufacturing electrochromic windows are described. An electrochromic (or "EC") device is fabricated to substantially cover a glass sheet, for example float glass, and a cutting pattern is defined based on one or more areas in the device from which one or more electrochromic panes are cut. In various embodiments, the cutting pattern is defined, at least in part, only after the electrochromic device has been fabricated and characterized. In some cases, the cutting pattern is defined after taking into account the overall quality of the electrochromic device and/or the location of defects in the device. For example, the electrochromic device may be probed to determine the location of all defects or certain types or classes of defects. The cutting pattern then excludes those defects from usable window panes, resulting in an overall high-quality product and a high-yield process. In another example, the complete device sheet is inspected to determine the leakage current of the EC device or the resistivity of one or both of the EC device's electrode layers. If the leakage current is higher than a threshold or the resistivity of a TCO layer is higher than a threshold, the size of the electrochromic panes is limited to ensure that the resulting windows perform adequately in spite of the device's high leakage or the TCO's high resistivity.

In certain embodiments, inspection of the glass sheet and/or individual panes is performed at one or more points in the fabrication process. Various optical, electrical, chemical and/or mechanical metrology tests may be used to probe the product, for example, after EC device formation in order to define a cutting pattern for the glass sheet and/or after the individual panes are cut to test the individual panes. Individual layers of the EC device, the underlying substrate, etc. may be inspected. Inspection may include, for example, detection of defects in the EC device and/or edges of the glass.

One or more edge portions of the glass sheet may be removed prior to and/or as part of the patterning process to remove potential edge-related defects. Additionally, edges may be modified for strength, for example, by removing defects in the glass through mechanical and/or optical treatment. Separately, defective areas throughout the electrochromic device may be removed or mitigated by, for example, localized laser heating.

Laser scribes for isolating individual electrodes of EC devices on the individual electrochromic panes may be added prior to or after cutting the panes. Similarly, bus bars for delivering power to the EC device electrodes can be made before or after cutting the panes. A technique known as edge deletion (described below) can also be performed prior to or after cutting the electrochromic panes from the glass sheet.

Insulated glass units (IGUs) are fabricated from the cut electrochromic panes and optionally one or more of the panes of the IGU are strengthened. In certain embodiments, strengthening is accomplished by laminating glass or other reinforcing substrate to the cut panes. In a specific embodiment, the lamination is performed after the IGU is assembled.

A method of manufacturing one or more electrochromic panes may be characterized by the following operations: (a) fabricating an electrochromic device on a glass sheet; (b) defining a cutting pattern for cutting the glass sheet in order to create the one or more electrochromic panes, the cutting pattern defined, at least in part, by characterizing the glass sheet and/or electrochromic device by one or more physical features (characteristics) after fabrication of the electrochromic device; and (c) cutting the glass sheet according to the cutting pattern to create the one or more electrochromic panes. In one embodiment, characterizing the glass sheet and/or electrochromic device includes identifying the one or more low-defectivity areas, scribing one or more isolation trenches near one or more edges of the glass sheet, applying a temporary bus bar to the electrochromic device, and activating the electrochromic device in order to evaluate the electrochromic device for defectivity. Other methods of identifying defects, including areas of non-uniformity, in the EC device include application of polarized light to the glass pane and the like. In one embodiment, mapping data sets are created based on the one or more low-defectivity areas and/or non-uniform areas on the electrochromic device and the data sets are compared in order to maximize efficient use of the glass sheet.

In some embodiments, electrochromic devices employ all non-penetrating bus bars on the individual electrochromic panes. In this way, more viewable area is available in the electrochromic panes. The improved electrochromic panes may be integrated in IGUs and one or more of the panes may contain a strengthening feature such as a laminated substrate of glass, plastic or other suitable material.

These and other features and advantages will be described in further detail below, with reference to the associated drawings.

BRIEF DESCRIPTION OF THE DRAWINGS

The following detailed description can be more fully understood when considered in conjunction with the drawings in which:

FIGS. 4A-B are cross section schematics depicting two side views of an electrochromic device.

DETAILED DESCRIPTION

Figure 1A:
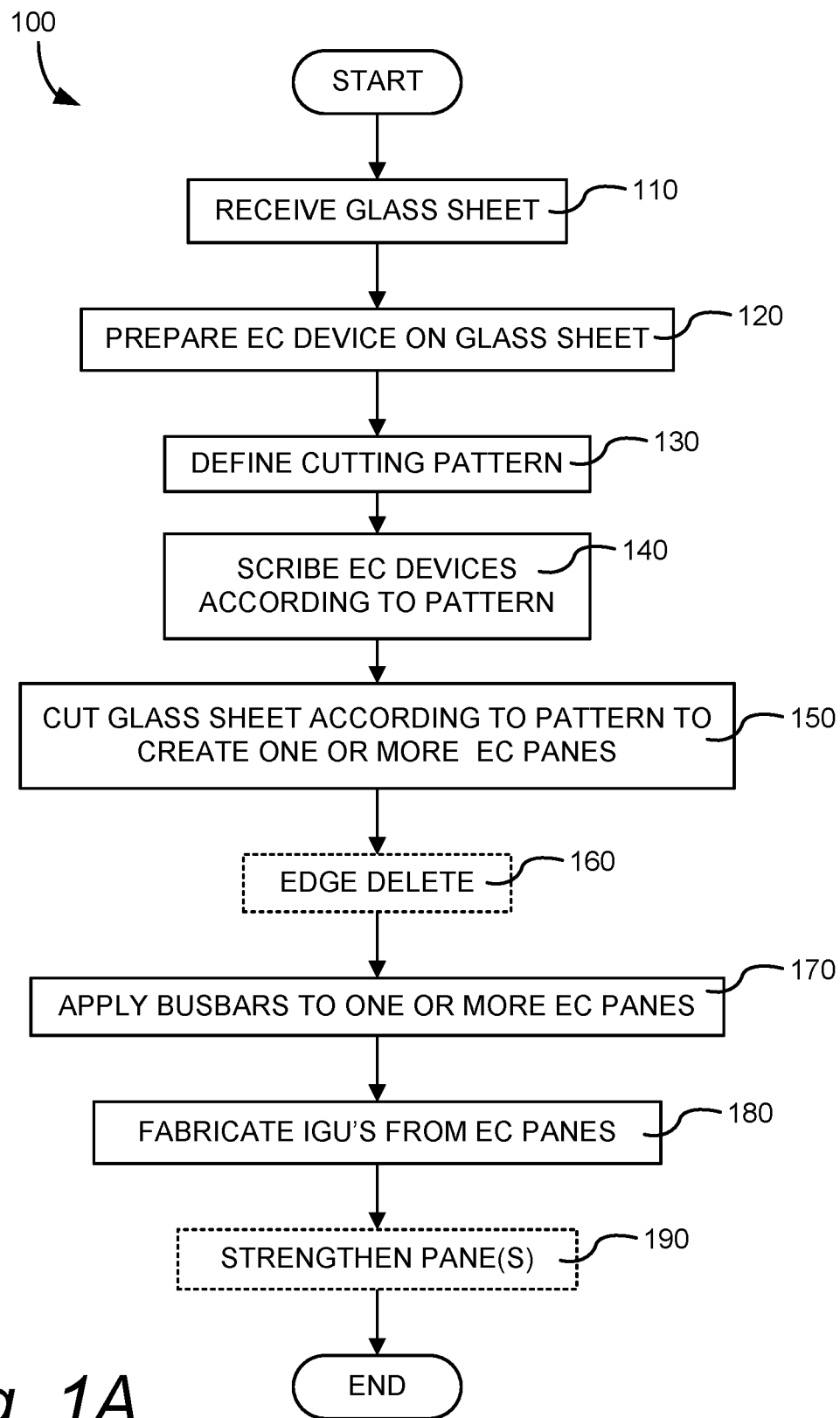
FIGS. 1A-B depict process flows describing aspects of fabrication methods of the invention.

For window applications, it is important that electrochromic panes be both strong and relatively free of defects. Conventionally, glass panes are strengthened by tempering. Unfortunately, the tempering process can introduce defects in an electrochromic device. Hence, most efforts to produce electrochromic windows employ a fabrication sequence of first cutting a glass pane to size, then tempering the glass, and finally forming the electrochromic device on the tempered window pane. The electrochromic device is typically formed by depositing a sequence of thin layers on one side of the pre-cut and tempered glass pane. Unfortunately, the described sequence of cutting and then forming the EC device frequently gives rise to some low quality electrochromic windows because modern fabrication processes often produce one or more visible defects on an electrochromic device. Of course, the manufacturer may refuse to tolerate low quality devices, but rejection of low quality panes corresponds to a reduction in yield.

As described herein, various fabrication methods can improve yield and quality. In these methods, initially an electrochromic device is fabricated to substantially cover a glass sheet. Only later is a cutting pattern for multiple electrochromic panes defined on the glass sheet. The cutting pattern may take into account various considerations including utilization of the sheet, defects in the EC device as fabricated, economic demand for particular sizes and shapes of EC panes, non-uniformity in the device and/or glass sheet, etc.

Frequently, problematic defects occur in only a very small or limited region or regions of the glass sheet. Once identified, these regions can be excluded when defining electrochromic panes in the cutting pattern. In this manner, the cutting pattern may account for high (or low) defectivity regions of the glass sheet. While it is often desirable to probe the EC device on the large glass sheet to identify and exclude regions of defects, it may sometimes be appropriate to exclude certain regions without probing the device. For example, it is sometimes observed that defects are concentrated around the perimeter of the large glass sheet. Therefore it is sometimes desirable to exclude the perimeter region from the pattern of electrochromic panes. In one example, between about 1 inches and about 10 inches around the perimeter of the glass sheet is removed after the electrochromic device is fabricated on the glass. In various embodiments, such perimeter regions are excluded as a matter of course, with the exact amount of excluded perimeter region being based on a knowledge of the quality control (QC) of a well-defined production fabrication process.

Scribes and/or bus bars for the individual panes are provided at some point after the cutting pattern is defined. As mentioned, these features may be provided to individual EC panes before and/or after the glass sheet is cut into one or more electrochromic panes according to the pattern. The cutting itself may employ a procedure that improves the strength of the resulting cut panes. Further, as explained below, the edges may be "finished" to mitigate problems created by cutting. Additionally, in some embodiments, IGUs are fabricated from the cut electrochromic panes and optionally one or more of the panes of the IGU are strengthened. More details of aspects of the invention are described below and with respect to the Figures.

FIG. 1A depicts a process flow, 100, including a sequence of operations for manufacturing one or more electrochromic panes. First a glass sheet is received, see 110. For the purposes of the embodiments described herein, a large glass sheet is intended to be cut into smaller panes at a later stage of the process. Typically, the panes are intended to be used as windows, so the physical dimensions as well as the optical and mechanical properties of the substrate should be appropriate for the intended window application. In a typical example, the large glass sheet employed at operation 100 is a piece of glass of between about 3 meters and about 6 meters in length on at least one side. In some cases, the glass is rectangular, being about 3 to 6 meters high and about 1.5 to 3 meters wide. In a specific embodiment, the glass sheet is about 2 meters wide and about 3 meters high. In one embodiment, the glass is six feet by ten feet. Whatever the dimensions of the glass sheet, the EC pane fabrication equipment is designed to accommodate and process many such sheets, fabricating EC devices on such sheets, one after another in succession.

Suitable glass for the glass sheet includes float glass, Gorilla® Glass (a trade name for alkali-aluminosilicate sheet glass available from Dow Corning, Corp. of Midland, Michigan) and the like. One of ordinary skill in the art would recognize that EC devices can be formed on other than glass substrates. Methods described herein are meant to include other substrates besides inorganic glass, for example, plexiglass would also work in some instances. For the purposes of simplicity, "glass sheet" is used from herein to encompass all types of window substrate, unless otherwise specifically qualified.

In one embodiment, the glass sheet is float glass, optionally coated with a transparent conducting oxide (TCO) and a diffusion barrier layer. Examples of such glasses include conductive layer coated glasses sold under the trademark TEC® Glass by Pilkington, of Toledo, Ohio and SUNGATE® 300 and SUNGATE® 500 by PPG Industries of Pittsburgh, Pennsylvania. The glass sheet has a size that is at least equal to the largest EC glass pane contemplated for manufacture. TEC® Glass is a glass coated with a fluorinated tin oxide conductive layer. Such glass typically also has a diffusion barrier layer between the TCO and the float glass to prevent sodium from diffusing from the glass into the TCO. In one embodiment, the glass sheet does not have a preformed TCO or diffusion barrier on it, for example, in one embodiment the diffusion barrier, a first TCO, an electrochromic stack and a second TCO are all formed in a single apparatus under a controlled ambient environment (infra). The glass sheet may be heat strengthened prior to fabrication of an electrochromic (EC) device thereon.

Next in the depicted process, an electrochromic (EC) device is prepared on the glass sheet, see 120. In the event that the glass sheet includes a pre-formed diffusion barrier and TCO, then the EC device uses the TCO as one of its conductors. In the event the glass sheet is float glass without any pre-formed coatings then typically 120 involves initially depositing a diffusion barrier layer, then a transparent conductor (typically a TCO) layer, and thereafter the remainder of the EC device is formed. This includes an EC stack having an electrochromic (EC) layer, a counter electrode (CE) layer and an ion conducting (IC) layer. After forming the EC stack, another transparent conductor layer (typically a TCO layer) is deposited as a second conductor (to deliver power to the EC stack). At this point, the EC device is completed and operation 120 is concluded. One or more capping layers may also be applied. In one example, a hermetic layer is applied to keep moisture out of the device. In another example, a low-E (emissivity) coating is applied.

As is understood by those of skill in the art, many different types of electrochromic devices exist, each having its own construction, electrode compositions, charge carrier, etc. Any of these devices may be employed in the windows described herein. Certain embodiments are described in relation to all solid state and inorganic electrochromic devices. Such all solid-state and inorganic electrochromic devices, and methods of fabricating them, are described in more detail in the following U.S. patent applications: Ser. No. 12/645,111, titled, "Fabrication of Low-Defectivity Electrochromic Devices," filed on Dec. 22, 2009 and naming Mark Kozlowski et al. as inventors; Ser. No. 12/645,159, titled, "Electrochromic Devices," filed on Dec. 22, 2009 and naming Zhongchun Wang et al. as inventors; Ser. Nos. 12/772,055 and 12/772,075, each filed on Apr. 30, 2010, and Ser. Nos. 12/814,277 and 12/814,279, each filed on Jun. 11, 2010—each of the latter four applications is entitled "Electrochromic Devices," each names Zhongchun Wang et al. as inventors. Each of the above patent applications is incorporated by reference herein for all purposes. In one embodiment, the electrochromic device is a low-defectivity all solid state and inorganic electrochromic device as described in the above applications. In one embodiment, the EC device is manufactured on the glass sheet in apparatus having a controlled ambient environment, that is, an apparatus in which the layers are deposited without leaving the apparatus and without, for example, breaking vacuum between deposition steps, thereby reducing contaminants and ultimately device performance. This manufacture may include deposition of a diffusion barrier on the glass sheet and the EC device including both electrodes (TCO layers).

As mentioned, inspections may be conducted internally at various points in the fabrication flow. For example, one or more of the TCO, EC, IC, CE layers may be inspected during processing. Optical, electrical, chemical, or mechanical inspections may be employed to characterize one or more parameters of the layers. Such parameters include, for example, optical density, sheet resistance, thickness, defectivity, morphology, and the uniformity of any of these across the glass substrate surface. Separately one or more inspections may be performed after the entire EC device is fabricated on the glass sheet surface. As explained elsewhere herein, such inspection may characterize defectivity at regions on the surface and/or non-uniformities in the EC device.

It would be understood by one of ordinary skill in the art that other switchable optical devices besides electrochromic devices may be employed in the described process. Many such devices are formed as layers on an underlying substrate. Examples of suitable optical devices include various liquid crystal devices and electrophoretic devices including rotating element and suspended particle devices. Any of these can be fabricated or otherwise provided on a large glass sheet and then processed as described herein.

Referring again to FIG. 1A, once the EC device is prepared, a cutting pattern is defined, see 130. As explained, defining a cutting pattern after depositing the electrochromic device affords considerable flexibility in determining which regions of the fabricated device are used and which are not used in the cut panes. It also, affords flexibility in determining appropriate sizes of the panes based on the overall quality of the fabricated electrochromic device. Of course, there are a range of considerations that drive the cutting pattern, and only some of them pertain to the quality or condition of the as fabricated device. Overall, the characteristics used in defining a pattern of EC panes on the glass sheet may include any one or more of the following: (1) local defectivity or other measure of local quality (for example, a local non-uniformity in sheet resistance), (2) demand for particular grades of product (for example some end users specify a particular grade or quality of EC pane), (3) demand for particular sizes and shapes of products, (4) remake demand (caused by breakages and/or low yield fabrication of certain types of EC panes), (5) current inventory of EC device types on the glass sheets and/or individual EC panes, (6) utilization of the area of the overall glass sheet, and (7) global properties of the EC device (for example, EC device leakage current and electrode (TCO) resistance). A global property might dictate the appropriate size or grade of the final EC pane(s). For example, high EC device leakage current or high TCO resistance might indicate that the resulting EC panes must be relatively small (for example, not greater than about 20 inches). Stated another way, the glass sheets, each with a fabricated EC device thereon, are binned based on global properties.

In some embodiments, one or more of the panes defined in the pattern are sized and shaped for residential window applications. In some cases, one or more of the panes defined in the pattern are sized and shaped for commercial window applications.

Based on the considerations above, defining a cutting pattern for cutting the glass sheet in order to create the one or more electrochromic panes can include characterizing one or more physical features of the glass sheet and/or electrochromic device after fabrication of the electrochromic device. In one embodiment, characterizing the one or more physical features include at least one of: 1) identifying one or more low-defectivity areas on the electrochromic device, 2) identifying one or more areas of non-uniformity in the electrochromic device, 3) identifying one or more areas where materials used to make the electrochromic device were deposited on the back side of the glass sheet; 4) identifying one or more performance characteristics of the electrochromic device; and 5) identifying one or more defects in the glass sheet. Identifying one or more low-defectivity areas in the electrochromic device is described in more detail below. Non-uniform areas in the EC device are, for example, areas where, for example, the coloration is not uniform due to variation in thickness of layers of the EC device, variation in properties of the device, for example, due to uneven heating during formation of the EC stack, and the like. Non-uniform areas thus may be independent of the number of, for example, short related optical defects. It may be desirable to remove these areas from the cutting pattern or include them in the cutting pattern but identify them as, for example, being areas from which a different quality of EC pane will be cut. Also, depending on the process conditions, materials used to make the electrochromic device can be deposited on the back side of the glass sheet due to overspray. This is undesirable and therefore the presence of backside deposition is a useful characteristic of the glass sheet after EC device formation. Areas with backside materials may be cleaned to remove the unwanted material and/or these areas are excluded from the cutting pattern. Performance characteristics of the electrochromic device are also an important parameter for characterizing the EC device. As described above, for example, an EC device may be used in different ways depending on whether it falls into a certain specification category. Identifying one or more defects in the glass sheet is also important, for example, irrespective of the EC device's performance, there may be a defect in the glass sheet, like a bubble or fissure trapped in the glass, that would be excluded from the cutting pattern due to its undesirable optical properties.

Figure 1B:
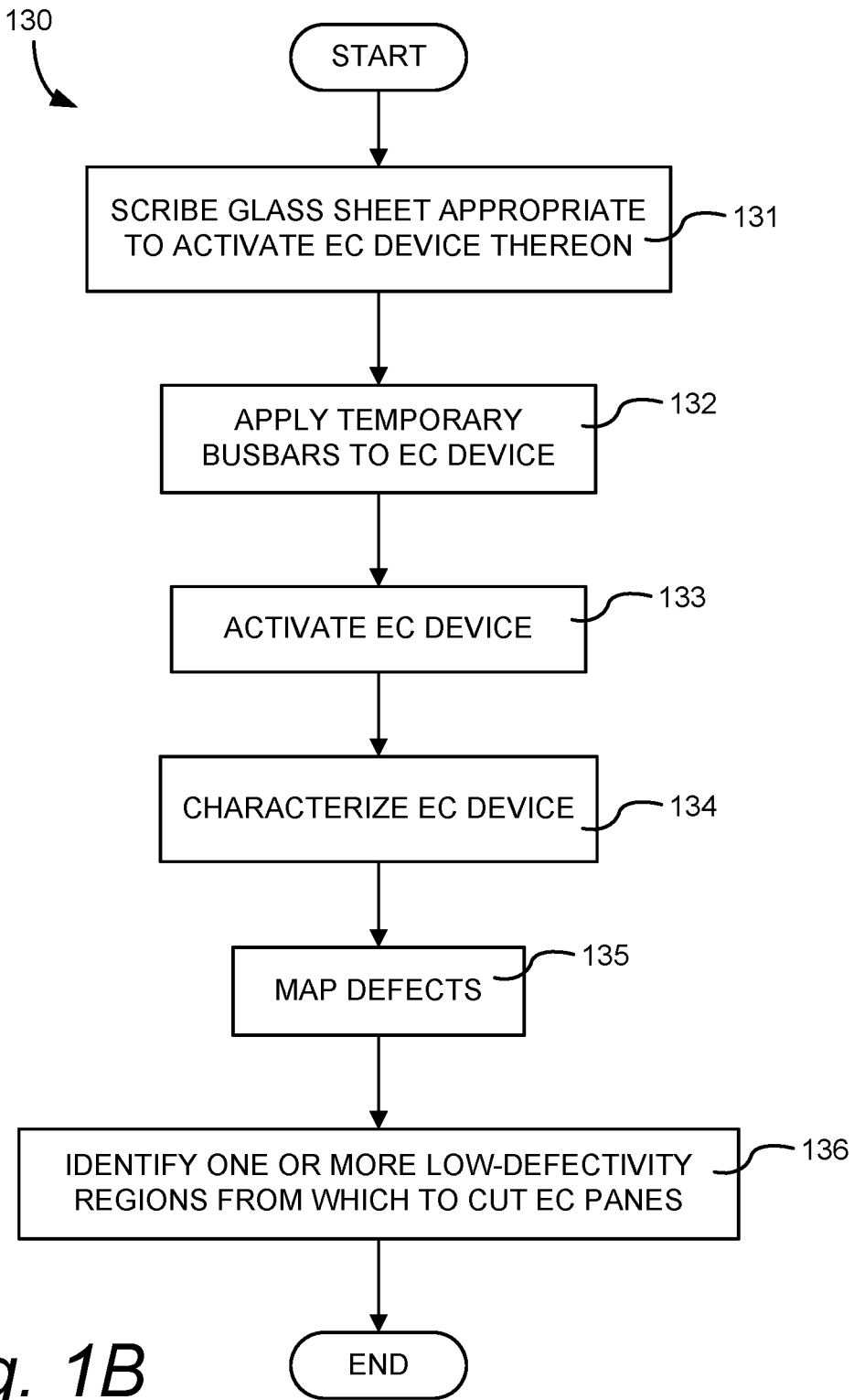

In a specific embodiment, the cutting pattern is defined (operation 130 of FIG. 1A) by first detecting and mapping the defectivity of the device across the glass sheet and then excluding or relegating areas of high defectivity from one or more electrochromic panes in the cutting pattern. FIG. 1B provides an example process flow for this embodiment. First, as depicted in block 131, the glass sheet's device is scribed in order to define a usable area, which is typically substantially the entire area of the device as prepared on the glass sheet. The scribing may serve two purposes. First it electrically isolates the two electrodes to provide a functioning device, and second it removes clearly defective portions of the EC stack. In some cases, deposited EC films in edge regions of the glass sheet exhibit roll off and/or other imperfections, and thus present the very real issue of short circuits. To address this problem, the edge regions of the device are isolated or removed. Techniques for accomplishing this include scribing (presented in FIG. 1B), edge deleting, or simply removing the glass sheet and associated device over some fraction of the perimeter.

After the scribe, temporary bus bars are applied, see 132. Then the device is activated by application of electrical energy to color or otherwise change the optical properties of the device so that the device can be characterized and any defects can be detected, see 133. Then device is characterized including identifying any defects and optionally classifying the defects as to type and/or severity, see 134. In some embodiments, non-uniformities in the EC device are characterized at this stage as well. and taken into account when defining the cutting pattern. In some embodiments this characterization includes the glass pane as well as the EC device on the glass pane. In some examples, the identification and/or classification is performed by the naked eye. In other examples, this operation is performed by an automated scanning device. In one embodiment, larger short-type visual defects are mitigated by application of electrical or optical energy. In a specific embodiment, such defects are circumscribed by laser ablation to create smaller pin-hole type defects. These mitigated defects may be included in the defect count when identifying regions of low defectivity. In another embodiment, this ablation or other mitigation is performed after the panes are cut from the glass sheet.

It should be understood that activating the EC device and scrutinizing the device is only one way to detect and identify defects. Other methods include using diffraction, reflection, or refraction of various forms of electromagnetic radiation that interact with the EC device, for example, polarized light and/or lock-in infrared (IR) thermography. Lock-in IR thermography is a non-destructive and non-contacting technique for the spatially resolved detection of small leakage currents in electronic materials that involves applying a temperature source to the material (in this case the EC device) and detecting leakage current induced temperature variations with, for example, an infrared camera. Thus, embodiments include not only activating the EC device to identify defects, but also may include, or use in the alternative, other methods of identifying defectivity.

As indicated, the cutting pattern defined on the glass sheet may exclude one or more high-defectivity areas of the electrochromic device provided on the glass sheet. Thus, the fabrication sequences contemplated herein frequently involve identifying regions of low or high defectivity prior defining a cutting pattern. In certain embodiments, "low-defectivity" areas are regions of the electrochromic device with fewer than a threshold number or density of defects. Defects may be identified and characterized in various ways. In certain embodiments, defects are identified and/or classified as described in U.S. patent application Ser. Nos. 12/645,111 and 12/645,159, both previously incorporated by reference.

In certain specific embodiments, only visual defects are considered when defining a cutting pattern. Visual defects include short-type defects that produce a halo when the device is darkened. A halo is a region in the device where an electrical short across the electrochromic stack causes an area around the short to drain current into the short and therefore the area surrounding the short is not darkened. These short defects are conventionally treated after fabrication of the electrochromic device, for example laser circumscribed to isolate them and remove the halo effect, which leaves smaller short-related pinhole defects. In a typical example, defects visible to the naked eye are on the order of 100 μm in diameter. In one embodiment, for defects of the size regime greater than 100 μm, the total number of visible defects, pinholes and short-related pinholes created from isolating visible short-related defects, in a low-defectivity area is less than about 0.1 defects per square centimeter, in another embodiment less than about 0.08 defects per square centimeter, in another embodiment less than about 0.045 defects per square centimeter (less than about 450 defects per square meter of electrochromic pane). Smaller defects, for example defects not visible to the naked eye (on the order of 40 µm or less), may be tolerable in higher densities in some embodiments.

The defects that are detected and optionally classified in the glass sheet are mapped, see operation 135 of FIG. 1B. This can be done, for example, by marking the glass to show where the defects are located once the device is inactive, and/or by storing the defect pattern in a memory as a map. This mapping information is analyzed to identify one or more low-defectivity regions from which to cut the one or more EC panes, see 136. One embodiment of the depicted method defines the cutting pattern by (a) creating a first mapping data set based on the one or more low-defectivity areas on the electrochromic device; (b) creating a second mapping data set based on another one or more low-defectivity areas on a second electrochromic device on a second glass sheet; (c) comparing the first and second mapping data sets; and (d) defining the cutting pattern using the comparison of the first and second mapping data sets to maximize efficient use of the glass sheet. For example, the mapping may be used to match two compatible EC sheets for use in a single IGU so that defects in the respective panes do not align. In one implementation, the first and second mapping data sets are stored in a memory and (c) and (d) are performed using an appropriate algorithm or other logic. Thus, these mapping data sets and comparisons thereof define the most efficient use of the glass sheet's device. For example, mapping data for two glass sheets may indicate that the most efficient use of the glass would be to cut the two sheets to accommodate different customers' specifications due to defectivity patterns that, if not present, would otherwise dictate cutting the sheets according to a single customer's specifications. Additionally, the logic may define panes of varying sizes from each glass sheet in order to supply electrochromic panes for a variety of window types and end users, for example, by pane size, defectivity level and the like. Once the one or more low-defectivity regions are used to define the cutting pattern and process flow 130 ends.

Figure 2A:
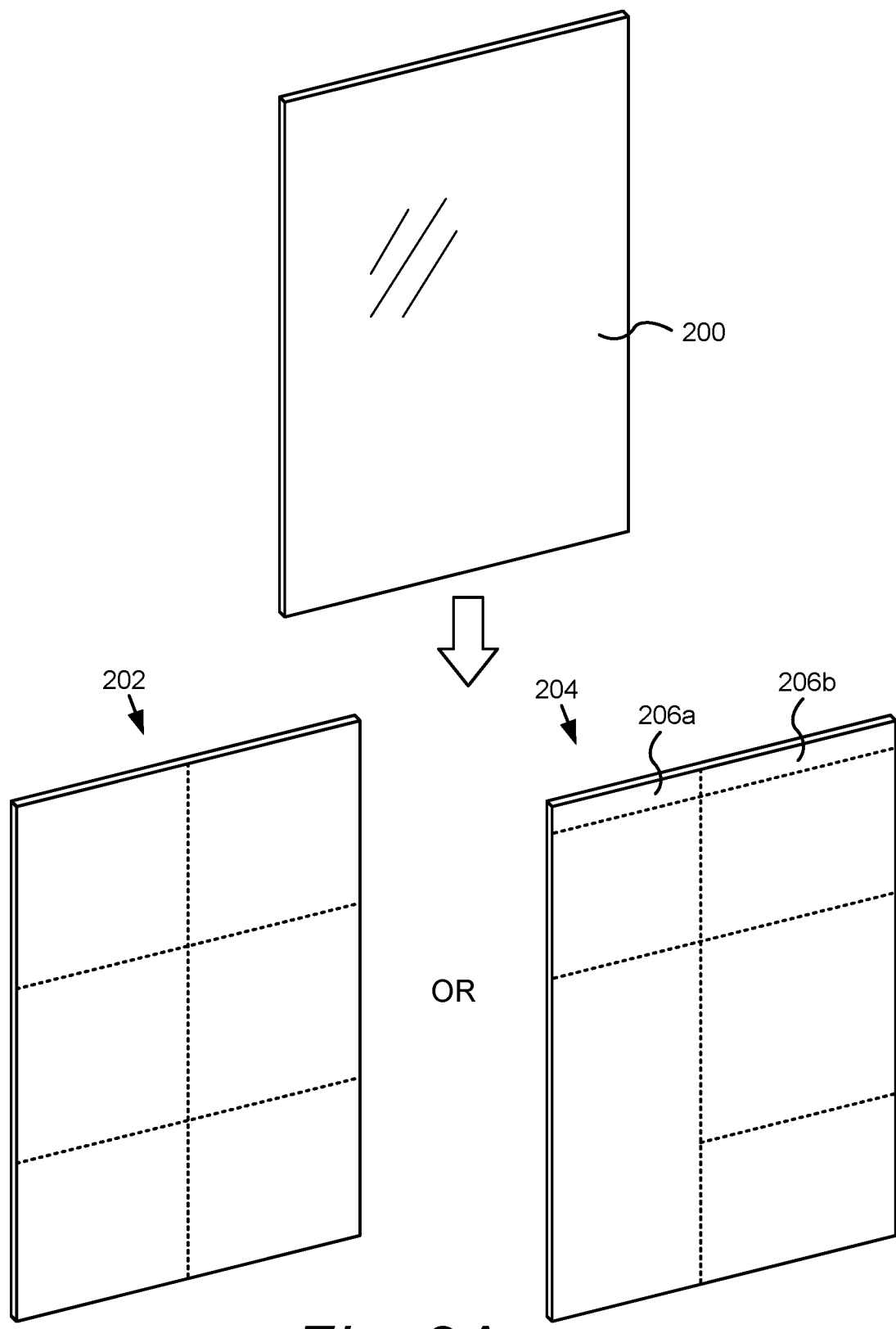
FIGS. 2A-B are schematics depicting aspects of fabrication methods of the invention.

FIG. 2A depicts a glass sheet, 200, for example about 3 meters by about 2 meters, or about 120 inches by 72 inches, with an EC device (not shown separately) thereon. In this example, in accord with process flow 100, a cutting pattern (as indicated by the dotted lines) is defined for cutting one or more electrochromic panes from glass sheet 200. Depending upon, for example, the defectivity, demand or other parameters described above, the cutting pattern can be regular, such as pattern 202, or irregular, such as pattern 204. Pattern 204 shows, for example, areas 206a and 206b, which collectively make a strip of glass that is to be discarded due to, for example, roll off and/or higher defect levels than the rest of the glass sheet. These perimeter areas may also be removed because of back side contamination of EC device materials due to overspray. From a single glass sheet, the one or more EC panes can be of the same size, or varying size depending on the need.

In some embodiments, prior to cutting the glass sheet, some or all edges of the sheet may be removed. In some embodiments about 1 to 10 inches of glass are removed around some or all of the glass sheet's perimeter. This edge trimming can be done for a variety of reasons. For example, the quality of the EC device may be inferior around the perimeter of the glass sheet. This low quality around the perimeter may be due to rolloff of the EC device stack, imperfections in the edge of the glass sheet (which can interfere with the EC device fabrication), propagation of such edge defects (e.g. fissures), and cathode dimensions as they relate to the glass sheet dimensions during deposition. Also, deposition of materials on the back side of the glass sheet due to overspray may necessitate trimming the edges of the glass. Non-uniformities in the EC device may occur due to contact of the support pallet during processing of the EC device or non-uniform heating near the edges of the glass. Some of these defects can be appreciated without powering the EC device and therefore edge trimming may be performed prior to testing the device. Thus edge trimming may be performed as a matter of course or as a result of, for example, performing test runs of the EC formation and finding that the process parameters require that edge trimming be performed post device fabrication to remove non-uniformities and/or back side overspray.

Referring again to FIG. 1A, after the cutting pattern is defined for the one or more EC panes, scribes are performed according to the needs of each individual EC pane to be cut from the glass sheet, see 140. A more detailed description of scribes used to fabricate individual EC panes is described below in relation to FIGS. 3A-C. In this process flow, the scribes are made prior to the individual EC panes being cut from the glass sheet. This saves time and resources that would otherwise be needed in order to scribe the individual panes, since a wide variety of pane sizes are contemplated as arising from the single glass sheet. In other embodiments, the scribes are made after the glass sheet is cut into individual EC panes (infra).

In the depicted example, after the EC devices on the glass sheet have been scribed, they are cut from the glass sheet according to the cutting pattern, see 150. The cutting can be accomplished by any suitable process. In some cases, the cutting is accompanied by an edge finishing operation. Mechanical cutting typically involves scoring the glass with a hard tool, such as a diamond tip on a wheel, followed by snapping the glass along the score line. Thus, mechanical cutting includes "scoring" and breaking. Sometimes the term "scoring" is referred to as "scribing" in the glass window fabrication industry. However, to avoid confusion with other operations described herein, use of "scribe" will be reserved for these other operations.

Cutting can produce microcracks and internal stresses proximate the cut. These can result in chipping or breaking of the glass, particularly near the edges. To mitigate the problems produced by cutting, cut glass may be subject to edge finishing, for example, by mechanical and/or laser methods. Mechanical edge finishing typically involves grinding with, for example, a grinding wheel containing clay, stone, diamond, etc. Typically, water flows over edge during mechanical edge finishing. The resulting edge surface is relatively rounded and crack free. Laser edge finishing typically produces a flat, substantially defect free surface. For example, an initial cut through the glass, perpendicular to the surface of the glass, may make a substantially defect free cut. However the right angle edges at the perimeter of the glass are susceptible to breakage due to handling. In some embodiments, a laser is used subsequently to cut off these 90 degree edges to produce a slightly more rounded or polygonal edge.

Examples of cutting and optional edge finishing processes include the following: (1) mechanical cutting, (2) mechanical cutting and mechanical edge finishing, (3) laser cutting, (4) laser cutting and mechanical edge finishing, and (5) laser cutting and laser edge finishing.

In one embodiment, the panes are cut from the glass sheet in a manner that actually strengthens and/or improves the edge quality of the resulting panes. In a specific example, this is accomplished using laser induced scoring by tension. In this method, a gas laser, for example a $CO_2$ laser with a wavelength of 10.6 μm, is used to heat the surface of the glass along a cut line to produce a compressive stress in the glass along the cut line. A cooling device, for example a gas and/or water jet, is used to quickly cool the heated line. This causes a score to form in the glass along the cutting line. The glass is then snapped by, for example, a conventional mechanical breaking device along the score. Using this method, the cut lines are extremely clean, that is, there are minimal if any defects in the glass that can propagate and cause further breakage due to stresses applied to the pane. In one embodiment, the edges are subsequently mechanically and/or laser finished to remove the 90 degree edges to create a more rounded and/or polygonal edge.

Referring again to FIG. 1A, optionally, edge deletion is carried out on the individual EC panes, see 160. Edge deletion is part of a manufacturing process for integrating the electrochromic device into, for example an IGU, where edge portions of the EC device, for example roll off (where layers of the device can make contact due to non-uniformity near the edge of for example a mask) and/or where a cut is made, are removed prior to integration of the device into the IGU or window. Where unmasked glass is used, removal of the coating that would otherwise extend to underneath the IGU frame (which is undesirable for long term reliability) is removed prior to integration into the IGU. Edge deletion is also used when a pane is cut from the glass sheet, as the panes will have EC material running to the edges of the pane. In one embodiment, isolation trenches are cut and the isolated portions of the EC device on the perimeter of the panes is removed by edge deletion. Edge deletion can be performed at any stage post formation of the EC device in the process flows described. The process of performing edge deletion is, in some embodiments, a mechanical process such as a grinding or sandblasting process. An abrasive wheel may be employed in for grinding. In one embodiment, edge deletion is done by laser, for example, where a laser is used to ablate EC material from the perimeter of the pane. The process may remove all EC layers including the underlying TCO layer or it may remove all EC layers except this bottom TCO layer. The later case is appropriate when the edge delete is used to provide an exposed contact for a bus bar, which must be connected to the bottom TCO layer. In some embodiments, a laser scribe is used to isolate that portion of the bottom TCO that extends to the edge of the glass from that which is connected to the bus bar in order to avoid having a conductive path to the device from the edge of the glass.

When edge deletion is to be used, it can be done before or after the EC panes are cut from the glass sheet. In certain embodiments, edge deletion may be carried out in some edge areas prior to cutting the EC panes, and again after they are cut. In certain embodiments, all edge deletion is performed prior to cutting the panes. In embodiments employing "edge deletion" prior to cutting the panes, portions of the EC device on the glass sheet can be removed in anticipation of where the cuts (and thus edges) of the newly formed EC panes will be. In other words, there is no actual edge yet, only a defined area where a cut will be made to produce an edge. Thus "edge deletion" is meant to include removing EC device material in areas where an edge is anticipated to exist.

Referring again to FIG. 1A, after the optional edge deletion, bus bars are applied to the one or more EC panes, see 170. As with edge deletion, the addition of bus bars can be performed after the EC panes are cut from the glass sheet or before, but after scribing. By performing the scribe, edge deletion and bus bar application prior to cutting the panes from the glass sheet, the associated special handling steps for a variety of EC pane sizes are avoided. That is, performing various manipulations and/or component integrations before the individual panes are cut from the glass sheet allows use of apparatus for handling the glass sheets of uniform size for maximum efficiency. However, in one embodiment, the glass sheet is cut according to 150, then edge deletion is performed according to 160, and thereafter the EC devices are scribed according to 140. In this embodiment, edge deletion is performed at the edges of the individual EC panes, and then the scribes are applied. In another embodiment, the glass sheet is cut according to 150, then the EC devices are scribed according to 140, and then edge deletion is performed according to 160. One advantage of scribing and deleting post cutting is uniformity in the edge deletion process, since only material from the perimeter where actual cut edges (rather than from areas where an edge is anticipated to exist post cutting) is removed. This method may include higher quality control since the edge of the glass can be used as a guide for the edge deletion.

After the panes with fully assembled EC devices are completed, IGUs are manufactured using the one or more EC panes, see 180. Typically, an IGU is formed by placing sealing separator, for example, a gasket or seal (for example made of PVB (polyvinyl butyral), PIB or other suitable elastomer) around the perimeter of the glass sheet. In some embodiments, the sealing separator includes a metal, or other rigid material, spacer and sealant between the spacer and each glass pane. After the panes are sealed to the spacer, a secondary seal is provided around the outer perimeter of the spacer, for example a polymeric material that resists water and that adds structural support to the assembly. Typically, but not necessarily, a desiccant is included in the IGU frame or spacer during assembly to absorb any moisture. In one embodiment, the sealing separator surrounds the bus bars and electrical leads to the bus bars extend through the seal. Typically, but not necessarily, the IGU is filled with inert gas such as argon. The completed IGU can be installed in, for example, a frame or curtain wall and connected to a source of electricity and a controller to operate the electrochromic window.

Figure 2B:
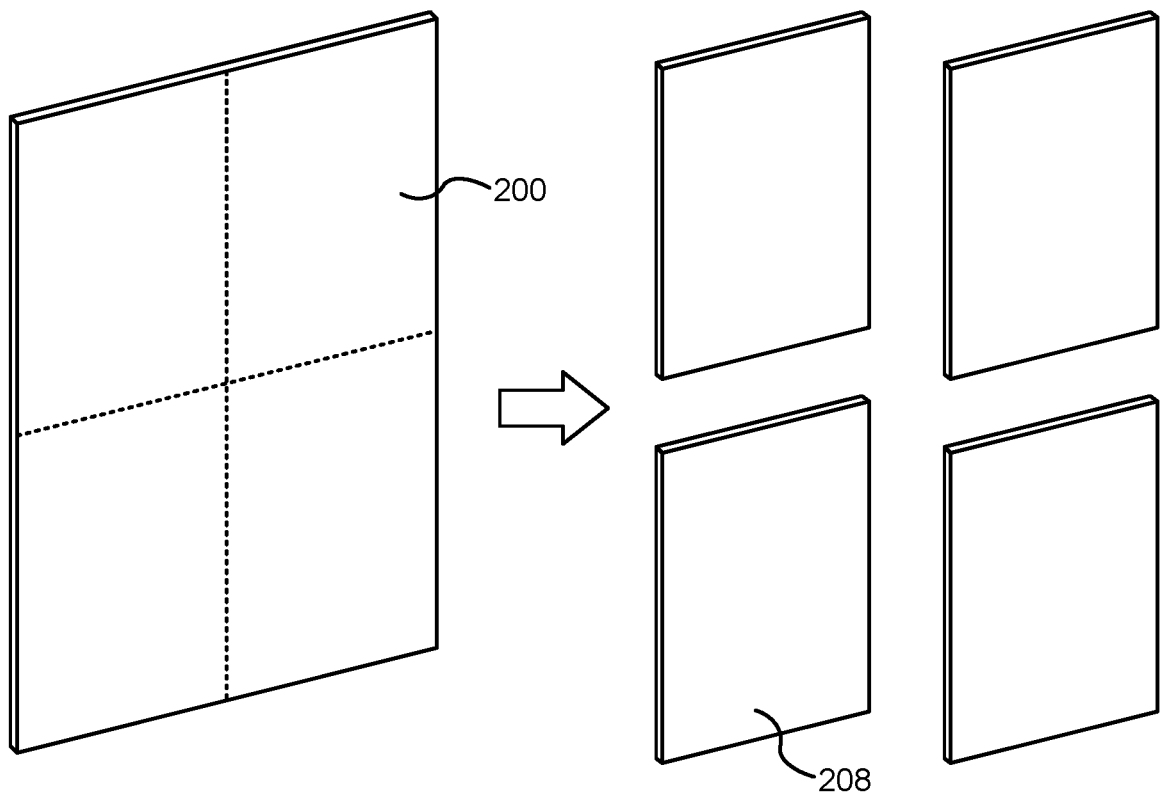
Figure 2B:
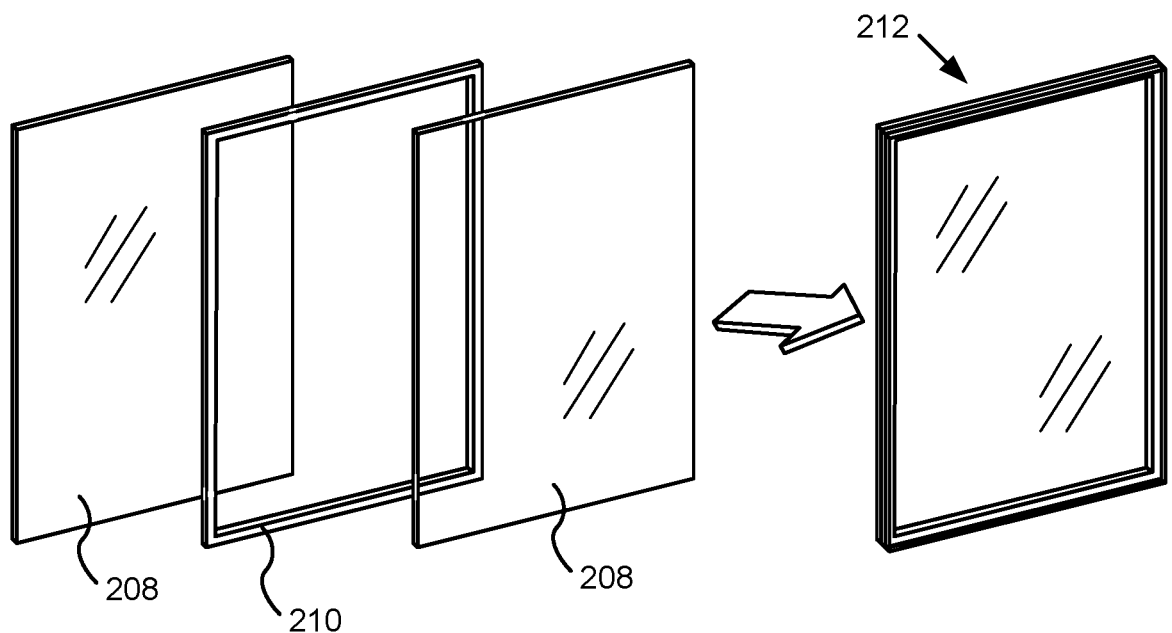

Referring to FIG. 2B, glass sheet 200 is cut according to a cutting pattern derived, for example, as described herein. In this example four (EC) panes, 208, are produced. Further, in this example, two of panes 208 are paired and combined with a sealing separator, 210, to form an IGU, 212. In this example, IGU 212 has two EC panes. Typically, but not necessarily, the panes are arranged so that EC devices face inside the IGU so as to be protected from the ambient. Electrochromic windows having two or more electrochromic panes are described in U.S. patent application Ser. No. 12/851,514, filed on Aug. 5, 2010, and entitled "Multipane Electrochromic Windows," which is incorporated by reference herein for all purposes. Methods described therein are particularly useful for making one or more electrochromic panes for use in multipane electrochromic windows. One advantage to such multipane electrochromic windows is that the likelihood of two defects aligning perfectly, and thus being observable to the end user, is quite small. This advantage is accentuated when low-defectivity panes are used. In embodiments where, for example, two electrochromic panes are used in a single window, the aforementioned (defect) mapping data sets can be used to further ensure that defects on individual panes, when registered in an IGU, do not align. This is yet another criterion that may be considered in patterning the glass sheet.

In certain embodiments, the glass sheet is up to 5 mm or even up to 6 mm thick (up to ¼ inch). In some embodiments, one or more panes are strengthened. Referring again to FIG. 1A, optionally, one or both panes of the IGU are strengthened, see 190. For example, in one embodiment, strengthening includes laminating one or more of the panes of the IGU with, for example, a thicker pane of float glass, a pane of tempered glass, a polymeric pane such as plexiglass, Gorilla® Glass, and the like. In another embodiment, strengthening includes applying a polymeric coating to one or more panes of the IGU. Examples of such polymeric coatings include ormosil polymeric coatings (epoxy resin, an amine hardener and a silane), sol-gel coatings, acrylic glazes, and other safety glazes, for example commercially available glazes which meet one or more impact test standards. Referring again to FIG. 1A, after one or more panes of the IGU are strengthened, process flow 100 ends.

In some embodiments, an edge bumper is employed to protect the edges of the glass after incorporation in the IGU. The protection allows the IGU to be safely transported from manufacturer to installation, for example. A protective edge bumper may be applied to IGUs with or without strengthened panes. In one embodiment, the protective bumper is a U-channel cap which fits over the glass edges around the perimeter of the IGU. It may be made from an elastomeric or plastic material. In one example, it is a vinyl cap.

Laminating an EC pane with a reinforcing substrate (or pane) after incorporation into an IGU has many benefits. For example, lamination after the EC pane is assembled in an IGU protects the EC device during the lamination process and provides ease of handing. This is particularly true if the EC device is on an inner facing surface of the IGU, that is, in the interior insulating region of the IGU, because lamination processes involve contacting the outer surfaces of the glass panes making up the lamination structure under relatively harsh conditions. Under such conditions, the EC device would be damaged if it was located on the outer surface of a lamination structure. The IGU thus protects the device during lamination. If the EC device is located on an outer facing surface of glass on the IGU, lamination of the EC pane would require lamination directly onto the EC device with the reinforcing pane and/or the adhesive used to attach it (the lamination pane). While lamination can be conducted without damaging the EC device, this approach has some downsides. Most notably, the IGU would be a less effective thermal insulator because radiation is blocked only at the interior of the IGU. Further, the exposed edges of the EC device, located around the perimeter of the IGU, may provide an ingress point for moisture after installation.

Many different lamination processes can be employed in the disclosed embodiments. Examples include roll pressing and autoclaving, vacuum bagging, and liquid resin lamination, each of which is well known in the window fabrication industry. In one embodiment, liquid resin lamination is used to strengthen an EC pane after it is incorporated into an IGU.

Figure 3A:
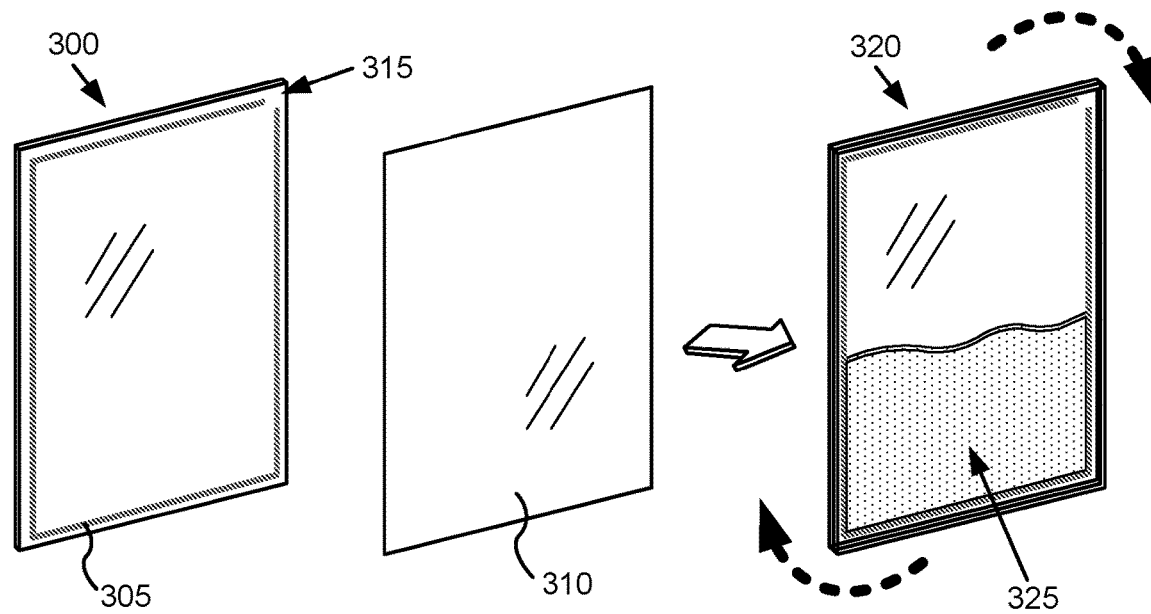
FIG. 3A depicts liquid resin lamination of a reinforcing sheet to an IGU.
Figure 3A:
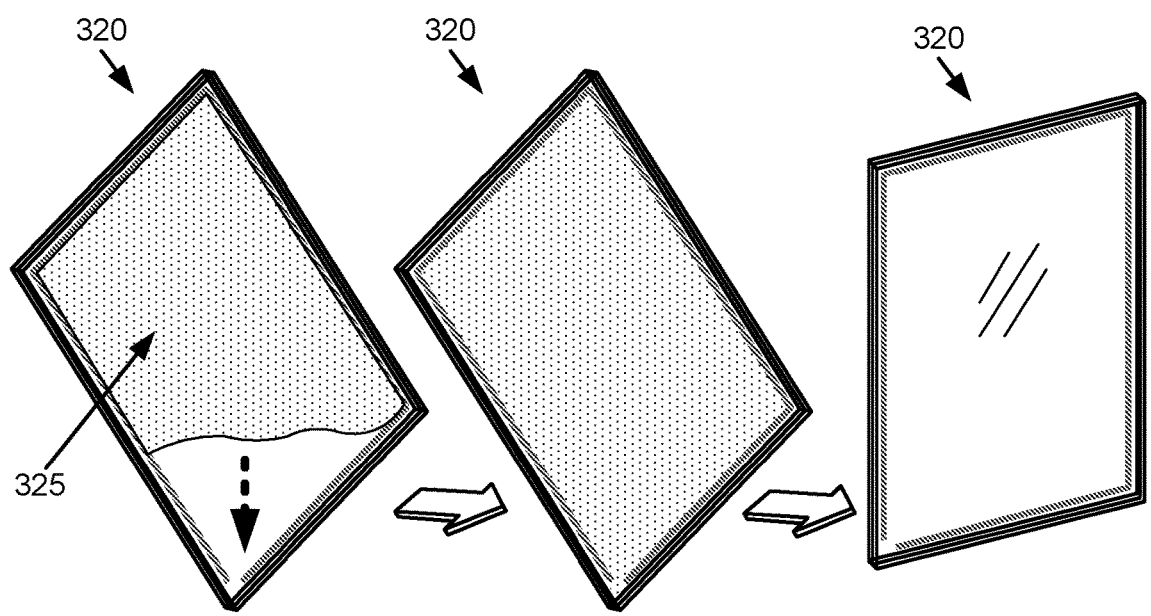

FIG. 3A schematically depicts aspects of a process flow for liquid resin lamination of an IGU, 300. In FIG. 3A, IGU 300 is drawn in less detail than for example IGU 212 described in relation to FIG. 2B. In this example, IGU 300 has an EC pane and a non-EC pane. Typically, double sided tape, 305, is applied to a perimeter region of the EC pane. A gap, 315, is left in the perimeter tape, for example, in a corner of the pane. A reinforcing pane, 310, is applied to the double-sided tape, so that a triple pane (see also FIG. 3B, in this example, the reinforcing pane is laminated to the EC pane of the IGU, and there is also the non-EC pane of the IGU which is not part of the laminate) structure, 320, is formed. A liquid resin, 325, is introduced, for example from the bottom as depicted, in the volume formed between the EC pane and reinforcing pane 310. This can be accomplished, for example, by leaving a small portion of the backing of the tape on when pane 310 is applied to the tape and registered with the EC pane. A dispensing nozzle, in the shape of a thin blade, is inserted in between pane 310 and the portion of the tape with the backing remaining. After the resin is introduced into the volume and the blade removed, the remaining tape backing is removed so that the only means of exit for the resin is gap 315. As indicated by the curved and dotted heavy arrows, unit 320 is then rotated so that the liquid resin 325 flows toward gap 315 (as indicated in the lower left diagram by the heavy dotted arrow downward). The appropriate amount of resin is introduced into the volume so that when the resin covers the entire area between the panes and within the tape, the panes are substantially parallel to each other. Once the volume is filled with resin, the resin is cured, for example, via heating, a catalyst and/or exposure to UV irradiation to form a strong bond between the panes. In the final assembly, as depicted in the lower right of FIG. 3A, the cured resin has the desired optical, mechanical and other properties of the lamination. Using liquid resin lamination imparts minimal if any stress on the EC pane during lamination.

Figure 3B:
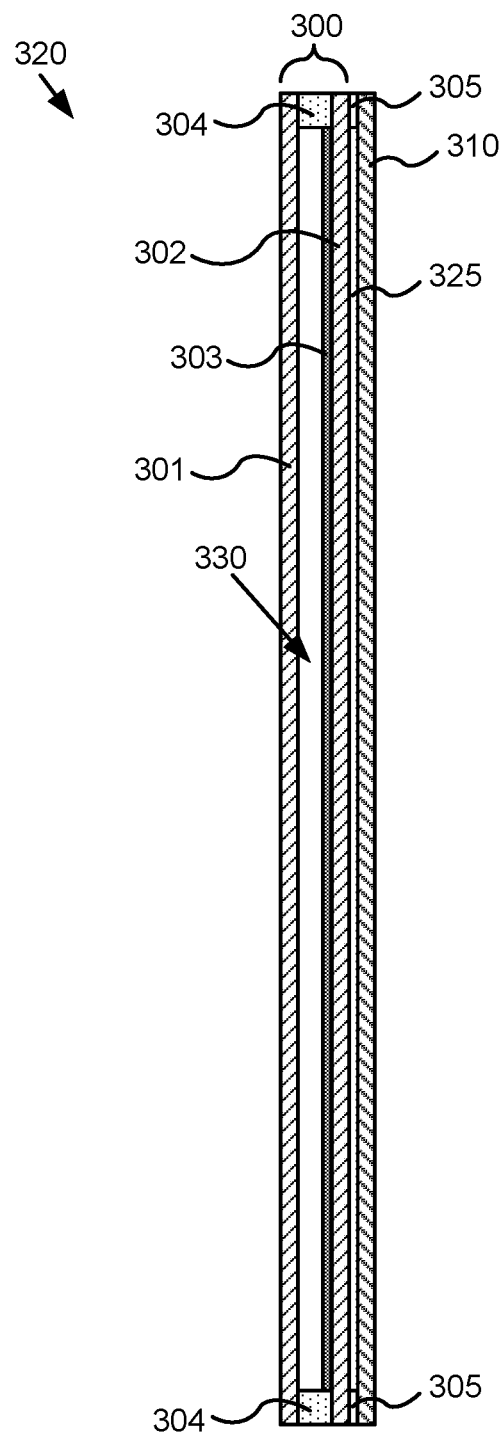
FIG. 3B depicts a cross section of the laminated IGU as described in relation to FIG. 3A.

FIG. 3B is a cross section showing more detail of the final assembly 320. The IGU portion, 300, includes a first pane, 301, and an EC pane, 302, which includes an EC device, 303, thereon. Panes 301 and 302 are separated by a sealing separator, 304, which spans the perimeter of the panes and has seals between it and each pane. An interior space, 330, is defined by the panes and the sealing separator. Tape 305 lies between (and proximate to the perimeter) of the face of the EC pane outside of the IGU's interior space and pane 310. Inside the volume created between the EC pane and pane 310 is the cured resin, 325.

Because resin based lamination relies on a sheet or film of resin sandwiched between the two glass panes to be laminated, choice of resin type can impart an optical characteristic to the window unit. In certain embodiments, the resin may contain additives that impart a desired optical property to the resulting laminate. Examples of such optical properties include color, opacity, scattering and reflectivity. In a specific example, the resin imparts a blue color. This can be particularly beneficial when used with some EC devices that have a naturally yellowish tint. The optical property can be imparted by adding dyes, pigments, scattering particles, metallic dust, etc. to the liquid resin prior to introduction into volume for lamination. In certain embodiments, the blue color is achieved as a result of a chemical reaction that takes place after the resin is introduced into the volume between the panes. For example, the reaction may be catalyzed by the same energy or reagent that catalyzes the curing of the resin. In another embodiment, the resin changes to a blue color after curing, for example, by exposure to normal ambient lighting and/or specific irradiation and/or heating post cure.

Figure 4C:
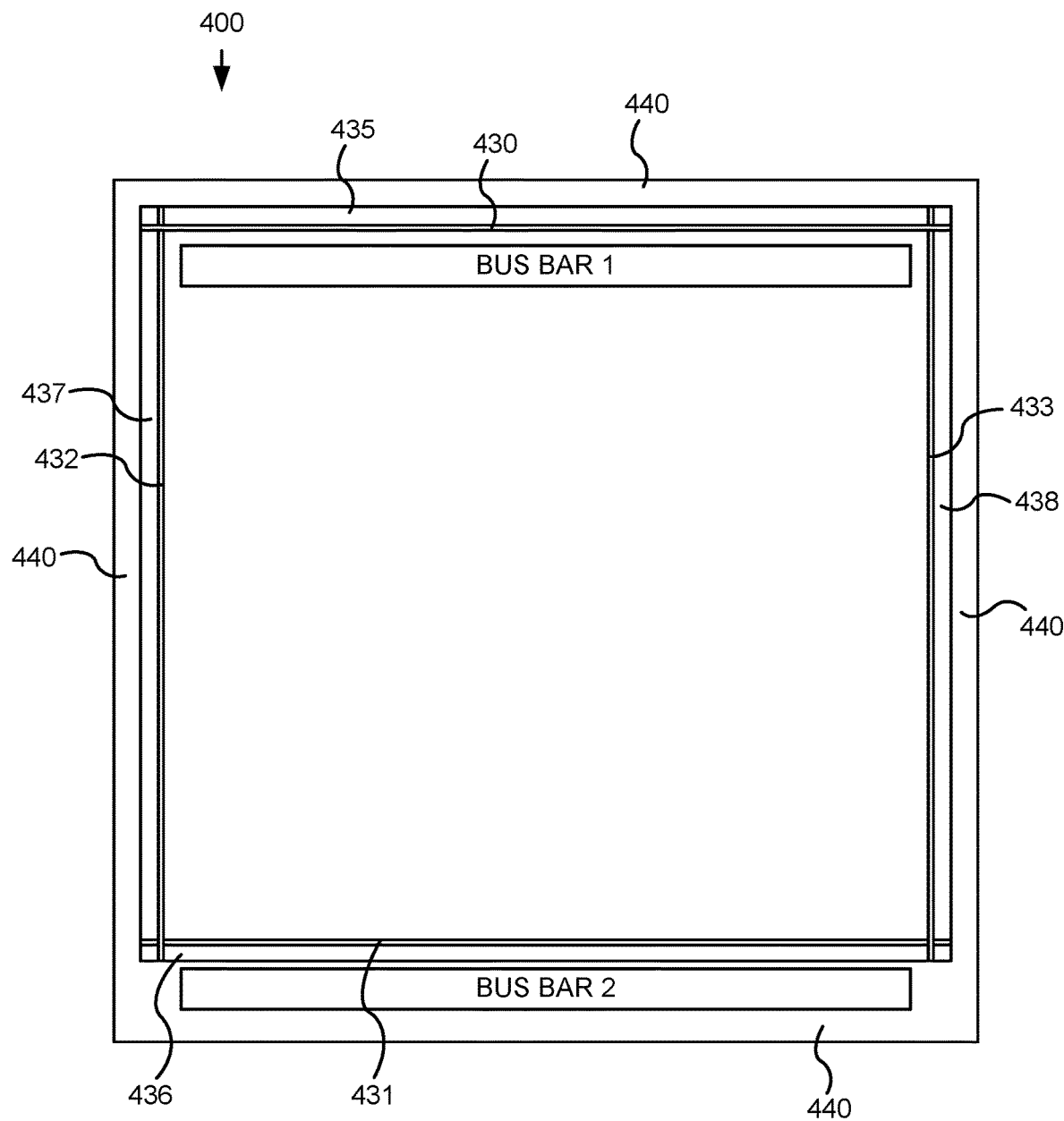
FIG. 4C is a schematic top view of the electrochromic device described in relation to FIGS. 4A-B.

Particular examples of electrochromic panes are described with reference to FIGS. 4A-C. FIG. 4A is a cross-sectional representation of an electrochromic pane, 400, which is fabricated starting with a glass sheet, 405, for example as outlined in process flow 100. FIG. 4B shows the cross sectional view from another side of EC pane 400, and FIG. 4C shows a top view of EC pane 400 (FIG. 4A is the view from the right or left side as depicted in FIG. 4C; and FIG. 4B is the view from the bottom side looking up as depicted in FIG. 4C). FIG. 4A shows the individual electrochromic pane after it has been cut from the glass sheet, edge deleted, laser scribed and bus bars have been attached. The glass pane, 405, has a diffusion barrier, 410, and a first transparent conducting oxide (TCO) 415 on the diffusion barrier. The TCO layer 415 is the first of two conductive layers used to form the electrodes of the electrochromic device fabricated on the glass sheet. In this example, the glass sheet includes underlying glass and the diffusion barrier layer. Thus in this example, the diffusion barrier is formed, then the first TCO, then the EC stack, and then the second TCO. In one embodiment, the electrochromic device (EC stack and second TCO) is fabricated in an integrated deposition system where the glass sheet does not leave the integrated deposition system at any time during fabrication of the stack. In one embodiment, the first TCO layer is also formed using the integrated deposition system where the glass sheet does not leave the integrated deposition system during deposition of the EC stack and the (second) TCO layer. In one embodiment, all of the layers (diffusion barrier, first TCO, EC stack and second TCO) are deposited in the integrated deposition system where the glass sheet does not leave the integrated deposition system during deposition.

After formation of the EC device, edge deletion and laser scribes are performed. FIG. 4A depicts areas 440 where the device has been removed, in this example, from a perimeter region surrounding the laser scribe trenches, 430, 431, 432 and 433, which pass through the second TCO and the EC stack, but not the first TCO, are made to isolate portions of the EC device, 435, 436, 437 and 438, that were potentially damaged during edge deletion from the operable EC device. In one embodiment, laser scribes 430, 432, and 433 pass through the first TCO to aide in isolation of the device (laser scribe 431 does not pass through the first TCO, otherwise it would cut off bus bar 2's electrical communication with the first TCO and thus the EC stack). The laser or lasers used for the laser scribes are typically, but not necessarily, pulse-type lasers, for example diode-pumped solid state lasers. For example, the laser scribes can be performed using a suitable laser from IPG Photonics (of Oxford Massachusetts), or from Ekspla (of Vilnius Lithuania). Scribing can also be performed mechanically, for example, by a diamond tipped scribe. One of ordinary skill in the art would appreciate that the laser scribes can be performed at different depths and/or performed in a single process whereby the laser cutting depth is varied, or not, during a continuous path around the perimeter of the EC device. In one embodiment, the edge deletion is performed to the depth below the first TCO. In another embodiment, a second laser scribe is performed to isolate a portion of the first TCO, for example as depicted in FIGS. 4A-C, near the edge of the glass pane from that toward the interior. In one example this scribe is at least along the edge where bus bar 2 is applied to the first TCO, between bus bar 2 and the edge.

After laser scribing is complete, bus bars are attached. Non-penetrating bus bar (1) is applied to the second TCO. Non-penetrating bus bar (2) is applied to an area where the device was not deposited (for example from a mask protecting the first TCO from device deposition), in contact with the first TCO or in this example, where edge deletion was used to remove material down to the first TCO. In this example, both bus bar 1 and bus bar 2 are non-penetrating bus bars. A penetrating bus bar is one that is typically pressed into and through the EC stack to make contact with the TCO at the bottom of the stack. A non-penetrating bus bar is one that does not penetrate into the EC stack layers, but rather makes electrical and physical contact on the surface of a conductive layer, for example, a TCO.

The TCO layer's can be electrically connected using a non-traditional bus bar, for example, screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, less laser scribing than conventional techniques which use penetrating bus bars, and the fact that the EC device colors to, and under, bus bar 1 (unlike conventional methods which cut an isolation trench through the device when bus bar 1 is a penetrating type bus bar), which provides a larger coloration area. Penetrating bus bar's can be used, for example in place of non-penetrating bus bar 1, but this will sacrifice colorable area and would necessitate a scribe through the first TCO, prior to fabrication of the EC stack on the glass. One embodiment contemplates performing this first scribe for the one or more EC devices on the glass sheet prior to fabrication of the EC device thereon. In such embodiments, the remainder of the method flow, for example as described in relation to FIGS. 1A and 1B, remains analogous.

Figure 5A:
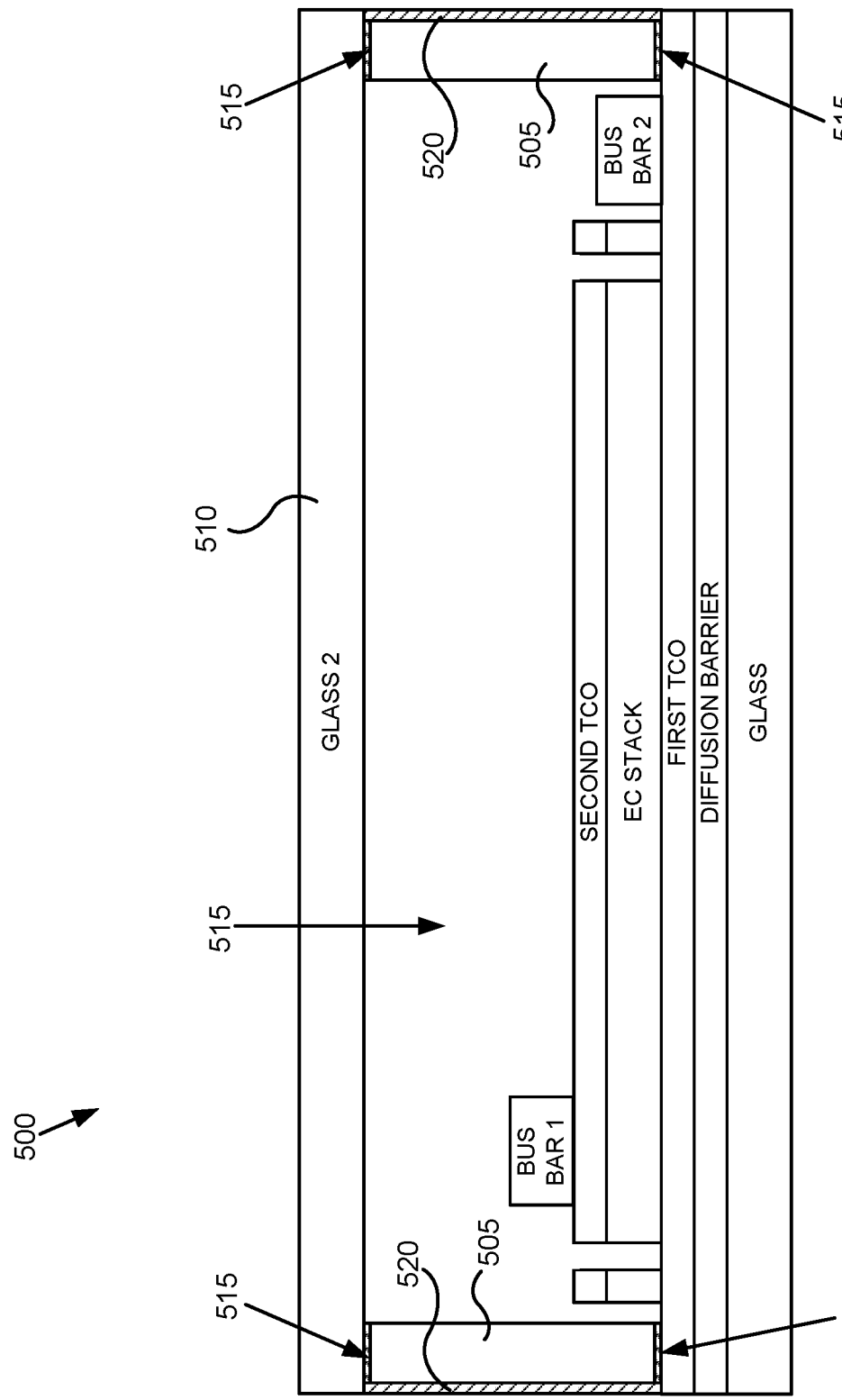
FIG. 5A is a cross section schematic showing the device described in relation to FIGS. 4A-C integrated into an IGU.

As described above, after the bus bars are connected, the device is integrated into an IGU, which includes, for example, wiring the bus bars and the like. In some embodiments, one or both of the bus bars are inside the finished IGU, however in one embodiment one bus bar is outside the seal of the IGU and one bus bar is inside the IGU. FIG. 5A depicts a cross section of the EC pane as described in relation to FIGS. 4A-C integrated into an IGU, 500. A spacer, 505, is used to separate EC pane 400 from another pane, 510. The second pane 510 in this example is a non-EC pane, however the invention is not so limited. Pane 510 can have an EC device thereon and/or one or more coatings such as low-E coatings and the like. Between spacer 505 and, in this example, the first TCO of EC device 400, is a primary seal, 515. This seal is also between separator 505 and the second glass pane. Around the perimeter of separator 505 is a secondary seal, 520 (bus bar wiring traverses the seal for connection to controller). These seals aid in keeping moisture out of the interior space, 515, of the IGU.

Figure 5B:
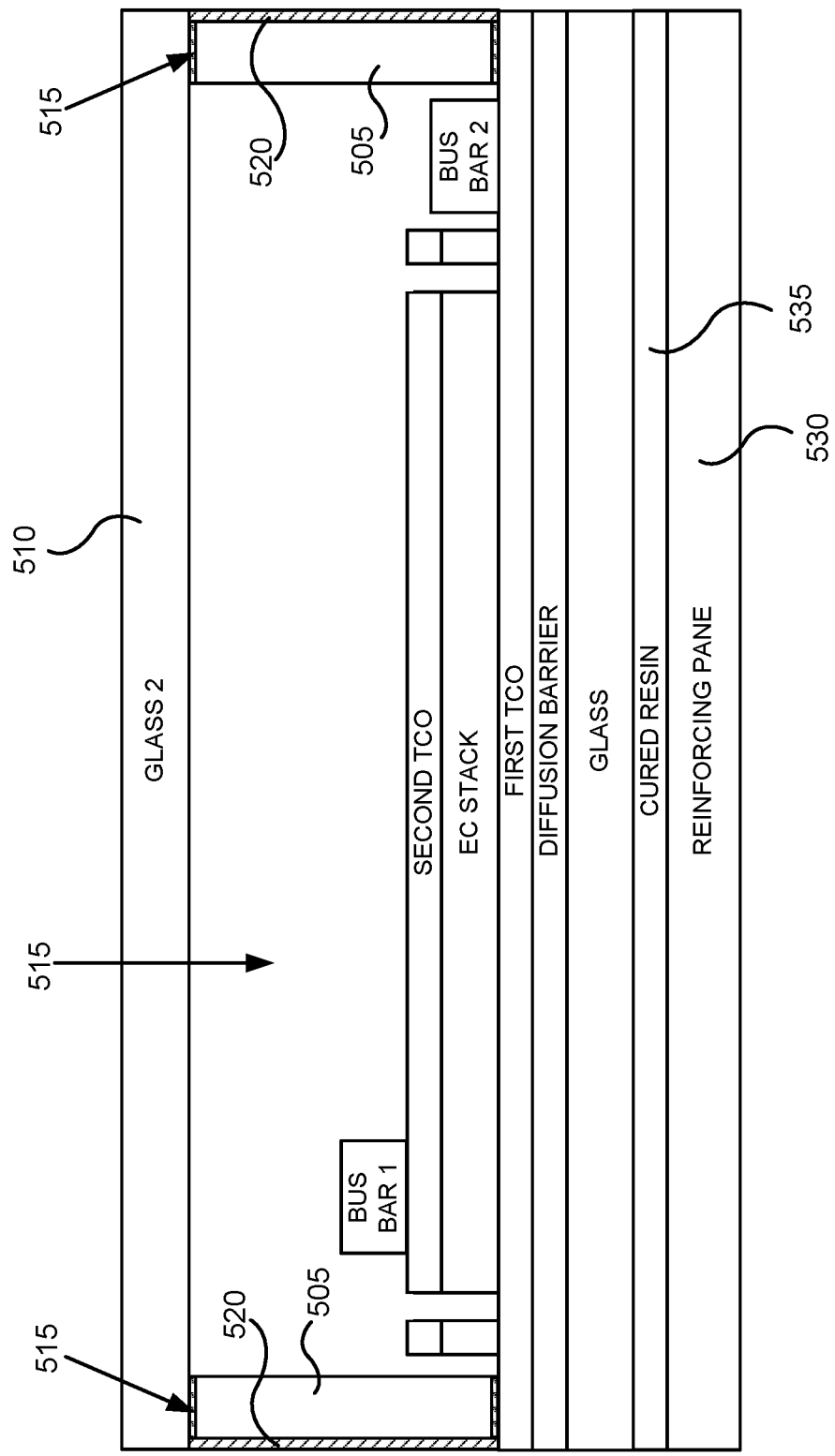
FIG. 5B is a cross section schematic showing the IGU as in FIG. 5A, where the EC pane is strengthened by lamination.

FIG. 5B depicts IGU 500 after lamination with a reinforcing pane, 530. In this example a liquid resin lamination was used, and thus, cured resin, 535, lies between the reinforcing pane and the glass of the EC pane. Although not depicted, one of ordinary skill in the art would appreciate that if glass 2 also had an EC device thereon, it could also be laminated. One embodiment is an IGU including two EC panes separated by an interior space, in one example both EC devices are in the interior space of the IGU, where both EC panes are reinforced. In one embodiment, the EC panes are reinforced with liquid resin lamination as described herein. In other embodiments, one or both of the EC panes are reinforced or strengthened by applying a coating as described herein.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

We claim:

1. A method of manufacturing a glass sheet comprising an electrochromic device deposited thereon, the method comprising:
   determining a usable area of the glass sheet from which to cut a plurality of electrochromic panes, wherein the usable area is an area of the glass sheet in which the electrochromic device is disposed;
   determining one or more characteristics and/or parameters for each electrochromic pane of the plurality of electrochromic panes to be cut from the glass sheet;
   defining a cutting pattern for cutting the glass sheet to create the plurality of electrochromic panes, wherein the cutting pattern is based on the one or more characteristics and/or parameters; and
   applying the cutting pattern to the glass sheet;
   wherein the one or more characteristics and/or parameters include one or more of grade, quality, size, shape, demand, yield, utilization of the usable area of the glass sheet, properties of the electrochromic device, leakage current, resistance, economic demand, or condition; and
   wherein defining the cutting pattern includes comparing the one or more characteristics and/or parameters of one electrochromic pane to another electrochromic pane of the plurality of electrochromic panes.

2. The method of claim 1, wherein the defining of the cutting pattern is based on efficient use of the glass sheet.

3. The method of claim 1, wherein the defining of the cutting pattern includes determining which of the electrochromic panes can be cut from the glass sheet.

4. The method of claim 1, wherein the defining of the cutting pattern includes determining at least one region of the glass sheet used for the electrochromic panes and which are not used.

5. The method of claim 1, wherein the defining of the cutting pattern is based on a property providing a size or a grade of the electrochromic panes.

6. The method of claim 1, wherein the cutting pattern is configured to create electrochromic panes of a same size.

7. The method of claim 1, wherein the cutting pattern is configured to create electrochromic panes of different sizes.

8. The method of claim 1, wherein each electrochromic pane of the plurality of electrochromic panes comprises:
   a substrate,
   a first transparent conductive layer,
   a second transparent conductive layer,
   an electrochromic layer between the first and second transparent conductive layers, and
   a counter electrode layer between the first and second transparent conductive layers.

9. The method of claim 8, wherein the glass sheet comprises glass, aluminum, float class, or a polymer.

10. The method of claim 8, wherein each electrochromic pane of the plurality of electrochromic panes further comprises an ion conducting layer between the electrochromic layer and the counter electrode layer.

11. A method of manufacturing a glass sheet comprising an electrochromic device deposited thereon, the method comprising:
   determining a usable area of the glass sheet for a plurality of electrochromic panes to be cut, wherein the usable area is an area of the glass sheet in which the electrochromic device is disposed;
   defining a cutting pattern for cutting the glass sheet, wherein the cutting pattern is based on one or more characteristics and/or parameters of the plurality of electrochromic panes to be cut from the glass sheet; and
   applying the cutting pattern to the glass sheet;
   wherein defining the cutting pattern is based on grade, quality, size, shape, demand, yield, utilization of an area of the glass sheet, properties of the electrochromic device, leakage current, resistance, economic demand, and/or condition; and
   wherein defining the cutting pattern includes determining which regions of the glass sheet are used for the electrochromic panes and which are not used.

12. The method of claim 11, wherein the defining of the cutting pattern is based on efficient use of the glass sheet.

13. The method of claim 11, wherein the defining of the cutting pattern includes determining which of the electrochromic panes can be cut from the glass sheet.

14. A method of manufacturing a glass sheet comprising an electrochromic device deposited thereon, the method comprising:
   mapping a usable area of the glass sheet to identify one or more regions of the glass sheet from which to cut a plurality of electrochromic panes, wherein the usable area is an area of the glass sheet in which the electrochromic device is disposed, wherein the mapping is based on one or more characteristics and/or parameters for each electrochromic pane of the one or more electrochromic panes;
   defining a cutting pattern using the mapping; and
   cutting the glass sheet with the electrochromic device disposed thereon according to the cutting pattern to create the plurality of electrochromic panes;
   wherein the one or more characteristics and/or parameters include one or more of grade, quality, size, shape, demand, yield, utilization of the usable area of the glass sheet, properties of the electrochromic device, leakage current, resistance, economic demand, or condition; and
   wherein defining the cutting pattern includes comparing the one or more characteristics and/or parameters of one electrochromic pane to another electrochromic pane of the plurality of electrochromic panes.

15. The method of claim 14, wherein the one or more characteristics and/or parameters include one or more of grade, quality, size, shape, demand, yield, utilization of the usable area of the glass sheet, properties of the electrochromic device, leakage current, resistance, economic demand, or condition.

* * * * *